US012093995B1

(12) United States Patent
Stewart et al.

(10) Patent No.: US 12,093,995 B1
(45) Date of Patent: Sep. 17, 2024

(54) CARD ECOSYSTEM GUEST INTERFACE IN VIRTUAL REALITY RETAIL ENVIRONMENTS

(71) Applicant: TARGET BRANDS, INC., Minneapolis, MN (US)

(72) Inventors: Kristi A. Stewart, Minneapolis, MN (US); Corey Hadden, Minneapolis, MN (US)

(73) Assignee: Target Brands, Inc., Minneapolis, MN (US)

( * ) Notice: Subject to any disclaimer, the term of this patent is extended or adjusted under 35 U.S.C. 154(b) by 0 days.

(21) Appl. No.: 18/486,558

(22) Filed: Oct. 13, 2023

(51) Int. Cl.
*G06F 3/048* (2013.01)
*G06F 3/04815* (2022.01)
*G06F 3/04845* (2022.01)
*G06Q 30/0601* (2023.01)
*G06T 19/20* (2011.01)
*G06F 3/0482* (2013.01)

(52) U.S. Cl.
CPC ..... *G06Q 30/0643* (2013.01); *G06F 3/04815* (2013.01); *G06F 3/04845* (2013.01); *G06Q 30/0623* (2013.01); *G06T 19/20* (2013.01); *G06F 3/0482* (2013.01); *G06T 2200/24* (2013.01); *G06T 2219/2004* (2013.01); *G06T 2219/2016* (2013.01)

(58) Field of Classification Search
None
See application file for complete search history.

(56) References Cited

U.S. PATENT DOCUMENTS

| | | | |
|---|---|---|---|
| 8,650,096 B2 | 2/2014 | Van Buskirk et al. | |
| 10,341,642 B2 | 7/2019 | Ueno et al. | |
| 11,126,320 B1 | 9/2021 | Thompson et al. | |
| 11,204,678 B1 * | 12/2021 | Baker | G06F 3/04842 |
| 11,422,671 B2 | 8/2022 | Mildrew et al. | |
| 11,495,003 B1 | 11/2022 | Agarwal et al. | |
| 11,593,870 B2 | 2/2023 | Delgado et al. | |
| 2022/0327608 A1 | 10/2022 | Assouline et al. | |

(Continued)

FOREIGN PATENT DOCUMENTS

| | | |
|---|---|---|
| CA | 3117878 A1 | 1/2022 |
| CA | 3128767 A1 | 3/2022 |

(Continued)

*Primary Examiner* — Thanh T Vu
(74) *Attorney, Agent, or Firm* — HSML P.C.

(57) ABSTRACT

Computer-implemented methods and systems to present a graphical user interface in a virtual reality retail environment of a retailer online service are provided. The methods and systems allow one or more guests to navigate products/services provided by the retailer online service within virtual reality retailer environments in an easy, accessible, and entertaining manner. A card ecosystem guest interface is provided that allows guests to search, filter and examine different product/services and can display one or more three-dimensional (3D) cards that provide information regarding the products/services available to purchase from the retailer online service. The guest can select a 3D card to view additional information regarding the product/service and to provide a miniature 3D model of the product/service. The guest can also generate a scaled 3D model of the product/service to interact with within the virtual reality retail environment.

16 Claims, 22 Drawing Sheets

(56) References Cited

U.S. PATENT DOCUMENTS

| | | | |
|---|---|---|---|
| 2022/0383400 A1 | 12/2022 | Wade et al. | |
| 2023/0005230 A1 | 1/2023 | Fersund et al. | |
| 2023/0063885 A1* | 3/2023 | Wuang | G06F 3/04845 |
| 2023/0065019 A1 | 3/2023 | Cook et al. | |
| 2023/0097571 A1 | 3/2023 | McCain et al. | |
| 2023/0394817 A1* | 12/2023 | Besecker | G06F 3/011 |
| 2023/0401802 A1* | 12/2023 | Maschmeyer | G06F 3/04842 |

FOREIGN PATENT DOCUMENTS

| | | |
|---|---|---|
| CN | 114432699 A | 5/2022 |
| NO | 20210498 A1 | 10/2022 |
| WO | 2022259253 A1 | 12/2022 |

\* cited by examiner

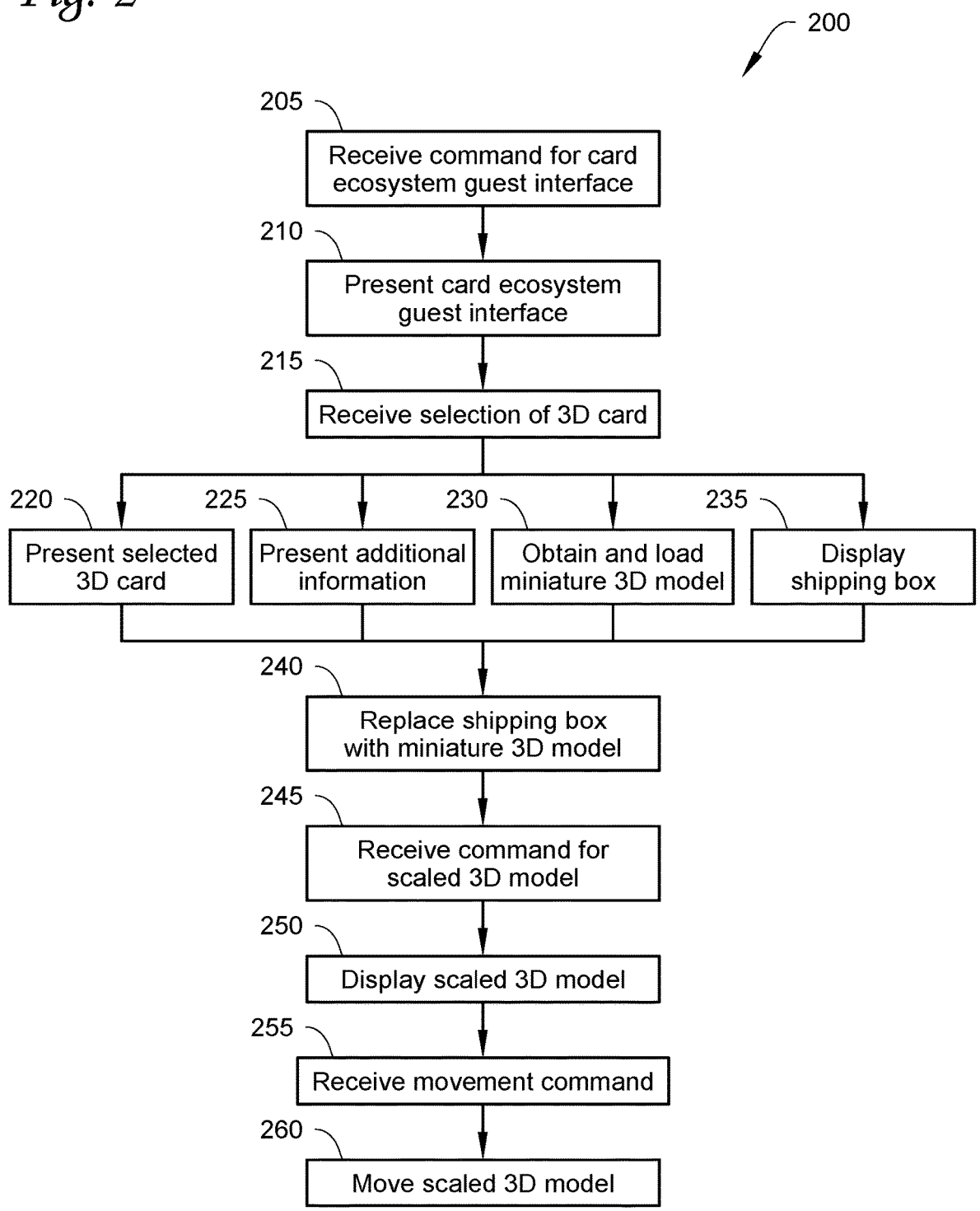

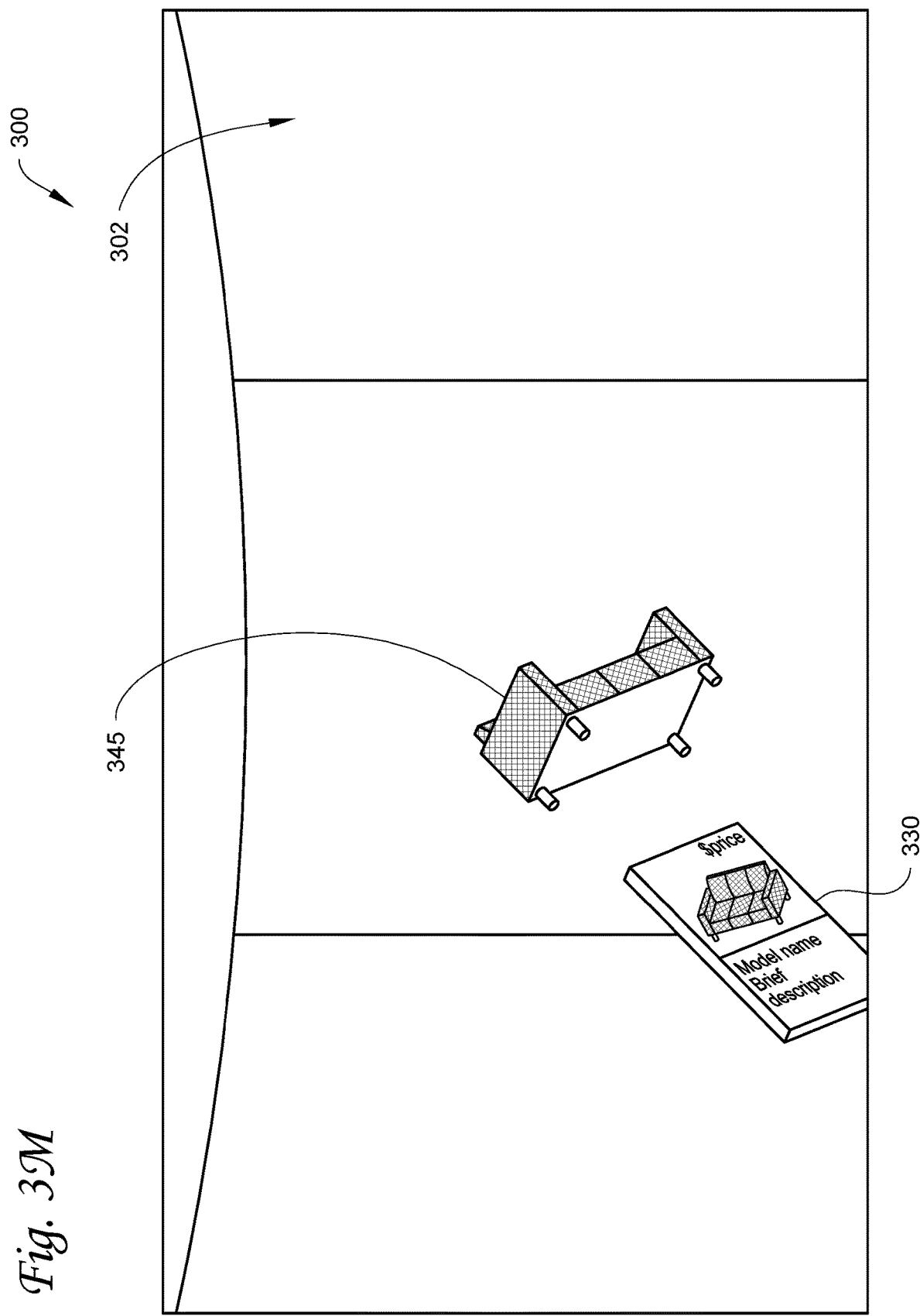

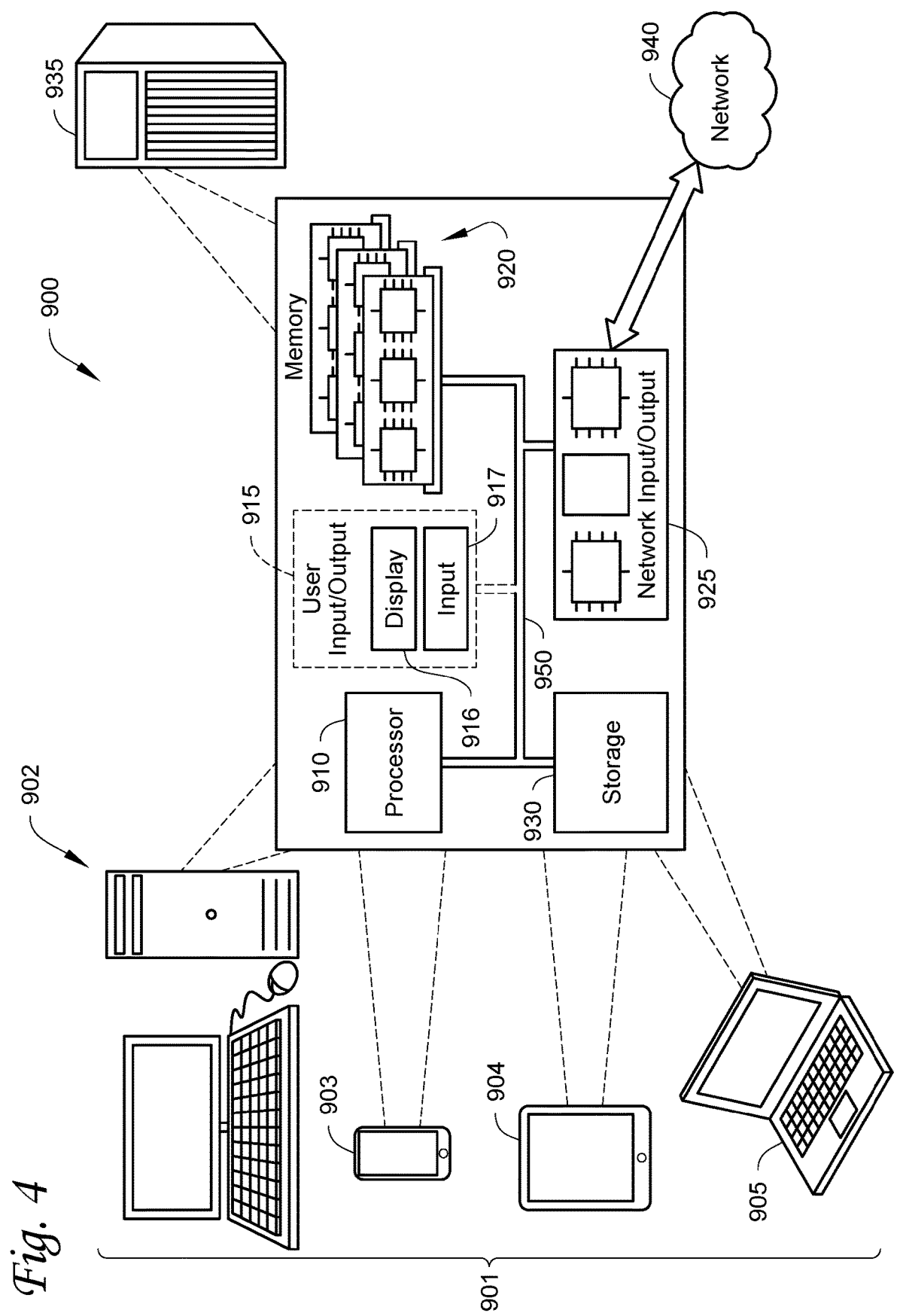

CARD ECOSYSTEM GUEST INTERFACE IN VIRTUAL REALITY RETAIL ENVIRONMENTS

FIELD

This disclosure relates generally to virtual reality retail environments. More specifically, this disclosure relates to systems and methods for providing a card ecosystem guest interface within virtual reality retail environments.

BACKGROUND

Online retail shopping continues to evolve as retailer online services look for new ways of increasing engagement with guests visiting the retailer online service. Guests are spending more time in virtual reality retail environments. Creating engagement between the retailer online service and guests via virtual reality retail environments is desireable.

SUMMARY

This disclosure relates generally to virtual reality (VR) retail environments. More specifically, this disclosure relates to systems and methods for providing a card ecosystem guest interface within virtual reality retail environments.

The embodiments disclosed herein can allow one or more guests (also referred to herein as "users") to navigate products and services provided by a retailer online service within virtual reality retailer environments in an easy, accessible, and entertaining manner. In particular, the embodiments disclosed herein can provide a three-dimensional (3D) card ecosystem guest interface that allows guests to search, filter and examine different product and service offerings provided by the retailer online service in virtual reality retailer environments.

In some embodiments, the card ecosystem guest interface can provide a search tool that allows the guest to search for products and services in a viewable table of 3D cards. The search tool can include filtering options to allow the guest to narrow the search results provided in the table of 3D cards. Each of the cards can display a picture of a product or service along with at least some product/service specific information (e.g., product/service name, company name, price, etc.) and guest actions (e.g., make favorite, place product/service into electronic shopping cart, add product/service to list/registry, etc.) for the guest to interact with card. The guest can use a motion controller to grab a card in a virtual reality retail environment to view additional information of the particular product/service such as a customer review score, product color options, etc. The additional information can be some of the product/service specific information that was not displayed on a 3D card. For example, the additional information of the product/service may be displayed on or adjacent to the card upon the guest using a motion controller to grab the card. In some embodiments, the additional information can be displayed on or adjacent the card in real time. The guest can use a motion controller to rotate and move the card within the virtual reality retail environment. In some embodiments, when a guest grabs a card using a motion controller, a 3D shipping box is displayed above the card while a 3D model of the product associated with the card is being loaded in real time. Once the 3D model of the product is loaded, a small version of the 3D model is displayed above the card. This small version of the 3D model can be pinned to the card and can be rotated, moved and turned around with the card. The guest can transform the small version of the 3D model into a large version of the 3D model that can be interacted with (grabbed, moved, rotated, etc.) by the guest within the virtual reality retail environment. The large version of the 3D model can be sized to scale within the virtual reality retail environment. In some embodiments, the card can be pinned to the large version of the 3D model so that it is provided adjacent to the 3D model. In some embodiments, a card of the card ecosystem guest interface can be for a specific product/service provided by the retailer online service. In some embodiments, a card of the card ecosystem guest interface can be a grouping of different products and/or services. In some embodiments, the guest can edit or create new cards for the card ecosystem guest interface. The new cards can include multiple products/services provided by the retailer online service that are grouped together by the guest. The multiple products/services can be two or more of the same product/service provided by the retailer online service and/or two more different products/services provided by the retailer online service. For example, a guest can create a room with different products offered by the retailer online service and make a card for that room with information for all of the products in the room.

In some embodiments, the virtual reality retail environment can access, for example, application programing interfaces (APIs) from a retailer online service to retrieve real time information for cards displayed in the card ecosystem guest interface. Accordingly, the virtual reality retail environment is not required to load static data regarding products/services provided by the retailer online service when the virtual reality retail environment is opened. When a guest performs a search using the search tool of the card ecosystem guest interface, one or more retailer online service APIs can pull real time data from one or more databases storing product/service specific information of products/services provided by the retailer online service(s) and then transfer the data to the virtual reality retail environment in real time. The data retrieved by the retailer online service APIs in real time from the one or more databases can also include 3D model data used to display a 3D model of a product in the virtual reality retail environment that can be interacted with by the guest.

In some embodiments, the data used to render a 3D model of a product in a virtual reality retail environment can be stored in a 3D model package file. The 3D model package file can include data for multiple 3D model versions of the same product with each 3D model version having a different level of fidelity (i.e., level of detail). In some embodiments, the 3D model package file can include data, for example, for seven different 3D model versions of the same product, with each of the seven versions having a different level of fidelity. The virtual reality retail environment can determine which version of the 3D model to render based on, for example, the distance of the guest avatar to the 3D model within the virtual reality retail environment. For example, if the guest avatar is close to the 3D model within the virtual reality retail environment, the virtual reality retail environment can load a version of the 3D model that has a higher fidelity (i.e., higher level of detail). If the guest avatar is far away from the 3D model within the virtual reality retail environment, the virtual reality retail environment can load a version of the 3D model with a lower fidelity (i.e., lower level of detail). It will be appreciated that different versions of the 3D model with different levels of fidelity will require different levels of computing resources to render within the virtual reality retail environment. For example, a higher fidelity version of the 3D model may have a greater file size and require more computing resources than a lower fidelity 3D model as the higher fidelity version of the 3D model has more detailed information of the model to be rendered. In some embodiments, the small version of the 3D model displayed above a card may be a version of the 3D model that does not have the highest fidelity level.

In one embodiment, a computer-implemented method to present graphical user interfaces in a virtual reality retail environment of a retailer online service is provided. The computer-implemented method includes receiving, via an input device, a command to present a three-dimensional (3D) card ecosystem within the virtual reality retail environment. The method also includes causing, via a display device, presentation of the card ecosystem within the virtual reality retail environment, the card ecosystem being aligned within a field of view of a user, and the card ecosystem including a plurality of 3D cards, wherein each of the plurality of 3D cards includes product specific information, the product specific information including: a picture of a product available for purchase from the retailer online service; a product name of the product; a company name of a company associated with the product; and a price of the product. Further, the method includes receiving, via the input device, a selection command to select one of the plurality of 3D cards within the virtual reality retail environment. Moreover, the method includes causing, via the display device, the selected 3D card to be displayed within the field of view of the user. Also, the method includes causing, via the display device, presentation of additional information on or adjacent the selected 3D card, the additional information including a customer review score of the product associated with the selected 3D card. The method also includes causing, via the display device, presentation of a shipping box adjacent the selected 3D card while a miniature 3D model of a product associated with the selected 3D card is loaded in real time within the virtual reality retail environment, the shipping box being anchored to the selected 3D card. Further, the method includes causing, via the display device, replacement of the shipping box with a presentation of the miniature 3D model adjacent the selected 3D card upon the miniature 3D model being loaded in real time within the virtual reality retail environment, the miniature 3D model being anchored to the selected 3D card. Moreover, the method includes receiving, via the input device, a generation command to generate a scaled 3D model of the product associated with the selected 3D card, wherein the scaled 3D model of the product is scaled to a true size of the product within the virtual reality retail environment. The method also includes causing, via the display device, presentation of the scaled 3D model within the field of view of the user. Also, the method includes receiving, via the input device, a movement command to move and place the scaled 3D model within the virtual reality retail environment.

In another embodiment, a system configured to present graphical user interfaces in a virtual reality retail environment of a retailer online service is provided. The system includes a retailer online service that is configured to: receive, via an input device, a command to present a three-dimensional (3D) card ecosystem within the virtual reality retail environment; cause, via a display device, presentation of the card ecosystem within the virtual reality retail environment, the card ecosystem being aligned within a field of view of a user, and the card ecosystem including a plurality of 3D cards, wherein each of the plurality of 3D cards includes product specific information, the product specific information including: a picture of a product available for purchase from the retailer online service, a product name of the product; a company name of a company associated with the product; and a price of the product; receive, via the input device, a selection command to select one of the plurality of 3D cards within the virtual reality retail environment; cause, via the display device, the selected 3D card to be displayed within the field of view of the user; cause, via the display device, presentation of additional information on or adjacent the selected 3D card, the additional information including a customer review score of the product associated with the selected 3D card; cause, via the display device, presentation of a shipping box adjacent the selected 3D card while a miniature 3D model of a product associated with the selected 3D card is loaded in real time within the virtual reality retail environment, the shipping box being anchored to the selected 3D card; cause, via the display device, replacement of the shipping box with a presentation of the miniature 3D model adjacent the selected 3D card upon the miniature 3D model being loaded in real time within the virtual reality retail environment, the miniature 3D model being anchored to the selected 3D card; receive, via the input device, a generation command to generate a scaled 3D model of the product associated with the selected 3D card, wherein the scaled 3D model of the product is scaled to a true size of the product within the virtual reality retail environment; cause, via the display device, presentation of the scaled 3D model within the field of view of the user; and receive, via the input device, a movement command to move and place the scaled 3D model within the virtual reality retail environment.

BRIEF DESCRIPTION OF THE DRAWINGS

References are made to the accompanying drawings that form a part of this disclosure and which illustrate embodiments in which the systems and methods described in this specification can be practiced.

FIG. 2 illustrates a flowchart of a method for presenting a card ecosystem guest interface in virtual reality retail environment(s), according to one embodiment.

FIG. 3A illustrates a screenshot of a portion of a virtual reality retail environment showing a guest avatar, according to one embodiment. FIG. 3M illustrates another screenshot of a portion of the virtual reality retail environment showing the selected 3D card with the miniature 3D model, according to one embodiment. FIG. 3O illustrates a screenshot of a portion of the virtual reality retail environment showing the scaled 3D model, the selected 3D card, and the virtual representation of the motion controller, according to one embodiment. FIG. 3S illustrates a screenshot of a portion of the virtual reality retail environment showing the second scaled 3D model, the second selected 3D card, the third scaled 3D model, and the third selected 3D card, according to one embodiment.

FIG. 4 illustrates a schematic diagram of architecture for a computer device, according to one embodiment.

Like reference numbers represent like parts throughout.

DETAILED DESCRIPTION

This disclosure relates generally to virtual reality retail environments. More specifically, this disclosure relates to systems and methods for providing a card ecosystem guest interface within virtual reality retail environments.

In particular, the embodiments described herein provide computer-implemented methods and systems to present graphical user interfaces in a virtual reality retail environment of a retailer online service. The computer-implemented methods and systems can allow one or more guests to navigate products/services provided by the retailer online service within virtual reality retailer environments in an easy, accessible, and entertaining manner. In particular, the embodiments disclosed herein can provide a card ecosystem guest interface that allows guests to search, filter and examine different product/service offerings provided by the retailer online service in virtual reality retailer environments. The card ecosystem guest interface can display one or more 3D cards that provide information regarding the products/services available to purchase by the retailer online service. The guest can select a 3D card to view additional information regarding the product/service and to provide a miniature 3D model of the product/service. The guest can also generate a scaled 3D model of the product/service to interact with within the virtual reality retail environment.

As defined herein, a retailer GUI can be, for example, a website, an app, etc. that allows guests to browse, shop for, and purchase products available for purchase from a retailer.

A virtual reality retail environment, as defined herein, refers to a virtual-reality space in which guests can experience and interact with a computer-generated retail environment and other guests.

Examples of retail services can include, for example, selling optical glasses, subscription to a beauty box service, nail salon services, air time with a mobile carrier, assembly and installation, device repair, bike repair, order pickup (e.g., drive up order pickup, store order pickup, etc.), store events (e.g., back to college event(s), parking lot/park concert(s), trick or treat event(s), reading event(s), etc.), quick response (QR) code scanning in retailer catalogue, QR code scanning on a user device, etc.

Figure 1:
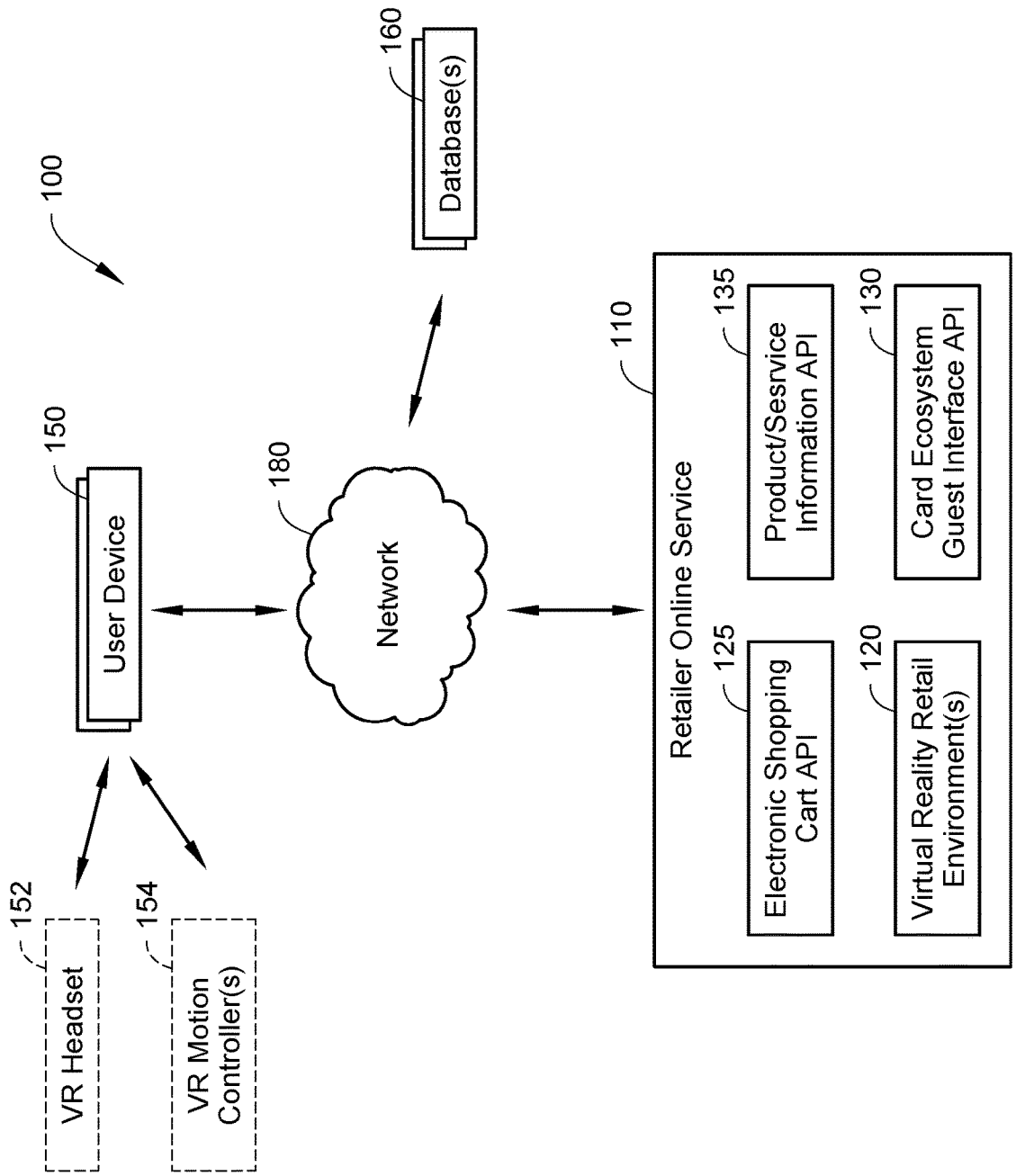
FIG. 1 illustrates a schematic diagram of a system for providing a card ecosystem guest interface within a virtual reality retail environment, according to one embodiment.

FIG. 1 is a schematic diagram of a system 100 for providing a card ecosystem guest interface within one or more virtual reality retail environments 120, according to one embodiment. The system 100 includes a retailer online service 110, one or more user devices 150, one or more database(s) 160, and a network 180 connecting the retailer online service 110, the one or more user devices 150, and the one or more database(s) 160.

The retailer online service 110 includes the virtual reality retail environment(s) 120, a shopping cart application programming interface (API) 125, a card ecosystem guest interface API 130, and a product/service information API 135. The retailer online service 110 is configured to provide an online retail experience for guests accessing the virtual reality retail environment(s) 120 via the one or more user devices 150. It will be appreciated that in other embodiments, the retailer online service 110 can include more or less APIs than those shown in FIG. 1 as required to perform the methods and systems described herein. In some embodiments, aspects of the retailer online service 110 can be the same as or similar to aspects of the server device 935 shown and described in accordance with FIG. 4 below.

The virtual reality retail environment(s) 120 is configured to provide a virtual-reality space in which guests can interact with a computer-generated environment and other guests. The virtual reality retail environment(s) 120 can replicate real and imaginary environments and simulate a guest's physical presence in those environments. This can be achieved using a combination of hardware and software that renders visual, audial, and tactile feedback based on guest movements and input. In some embodiments, this input can be through simple devices, such as a mouse, keyboard or gaming controller. In more advanced embodiments, physical motion of the guest can be tracked by using sensors placed on the guest or by analyzing real-time video of the guest, or a combination of both. The visual and audial rendering can be presented via a headset, Head Mounted Display (HMD), worn by the guest, although any mechanism that presents guest localized audio and video could be used. Tactile or haptic feedback can be given by a plethora of control devices, including but not limited to, hand held controllers with rumble motors, gloves, full and partial-body suits, chairs, controlled air flows and immersive smart-fluids. In addition, some environments supply smell and taste based sensory feedback.

Figure 3A:
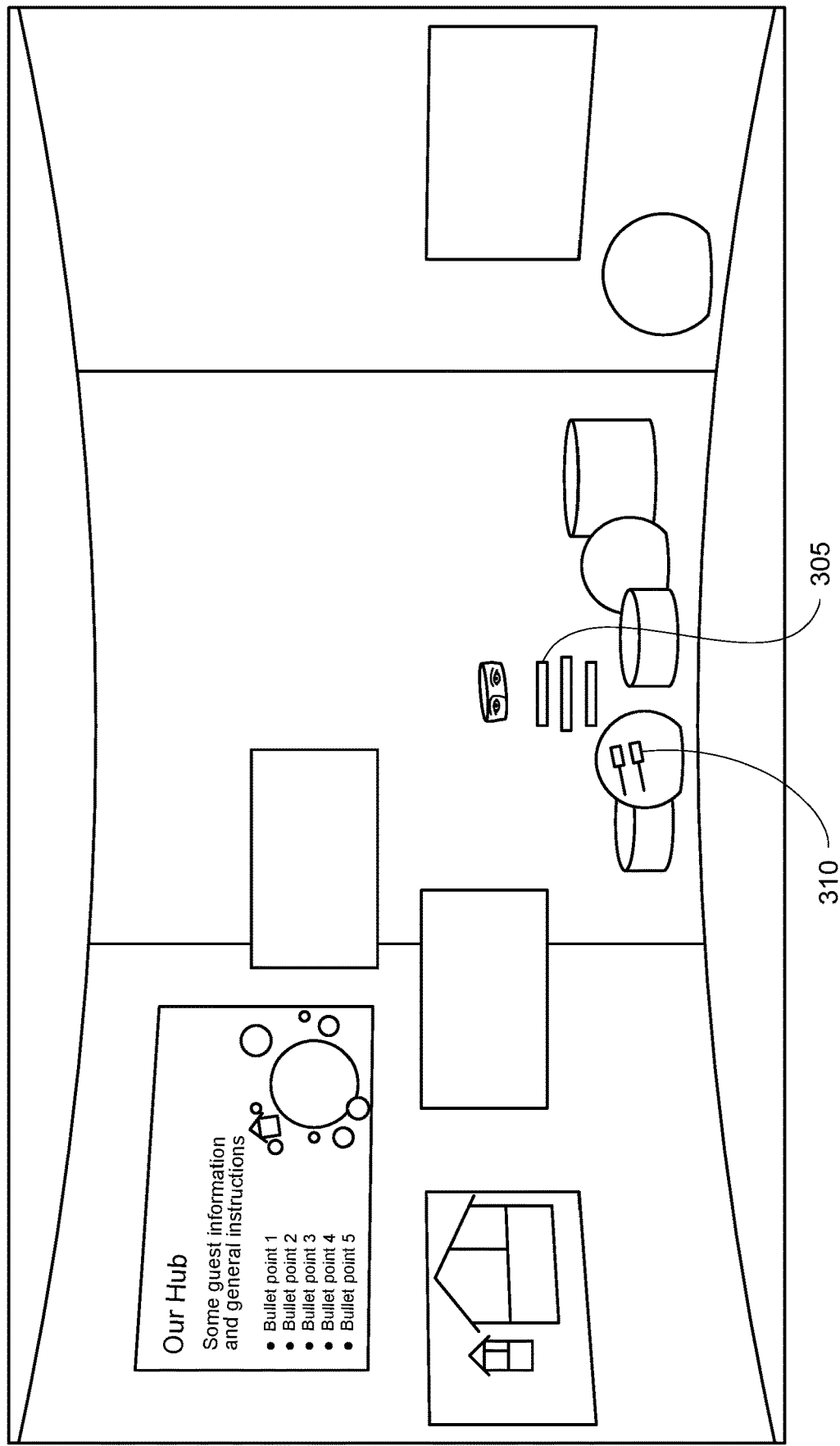
FIGS. 3A-3S illustrate different screenshots of a virtual reality retail environment that can present a card ecosystem guest interface, according to one embodiment.

In some embodiments, the virtual reality retail environment(s) 120 allow one or more guest(s), via the one or more user devices 150, to view or experience, browse, interact with, shop for, and purchase products and services from the retailer online service 110. The virtual reality retail environment(s) GUI 120 can also be configured to provide opportunities for guest participation or action with retailer curated events or promotions. The virtual reality retail environment(s) 120 can be accessed by the user device(s) 150 via a website, an app, etc. While the virtual reality retail environment(s) 120 are shown as part of the retailer online service 110, it will be appreciated that in other embodiments the virtual reality retail environment(s) can be downloaded or saved on the user device(s) 150. FIGS. 3A-3S, described below, illustrate different screenshots of content that may be displayed on the virtual reality retail environment(s) 120.

In some embodiments, the virtual reality retail environment(s) 120 can display a guest avatar representing a virtual representation of the guest at a particular location within the virtual reality retail environment(s) 120. The guest avatar can include a virtual representation of input/output device(s) being used by the guest (e.g., optional VR motion controller(s) 154).

The electronic shopping cart API 125 is configured to provide and store an electronic shopping cart for use by a guest while the guest is in the virtual reality retail environment(s) 120. That is, a guest can select one or more products or services provided in a card ecosystem guest interface for purchase and the one or more products or services are provided in the guest's electronic shopping cart that is maintained by the electronic shopping cart API 125. The virtual reality retail environment(s) 120 can access, for example, different APIs from the retailer online service 110 (e.g., the card ecosystem guest interface API 130, the product/service information API 135, etc.) to retrieve real time information for 3D cards displayed using the card ecosystem guest interface API 130. Accordingly, the virtual reality retail environment(s) 120 are not required to load static data regarding products or services provided by the retailer online service 110 when the virtual reality retail environment(s) is opened or loaded on the one or more user devices 150.

The card ecosystem guest interface API 130 is configured to provide the card ecosystem guest interface within the virtual reality retail environment(s) 120. In some embodiments, the card ecosystem guest interface API 130 can provide a search tool that allows the guest to search for products and services in a viewable table of 3D cards within the virtual reality retail environment(s) 120. The search tool can include filtering options to allow the guest to narrow the search results provided in the table of 3D cards. In particular, the card ecosystem guest interface API 130 can communicate with the product/service information API 135 to determine the search results. Each of the 3D cards provided by the card ecosystem guest interface API 130 can display a picture of a product or service along with product or service specific information (e.g., product/service name, company name, price, etc.) and guest actions (e.g., make favorite, place product/service into electronic shopping cart, add product or service to list/registry, etc.) for the guest to interact with 3D card within the virtual reality retail environment(s) 120. In some embodiments, when a 3D card is associated with a service, the 3D card can display a service logo as the picture of the service. The guest can use a VR motion controller 154 to grab a 3D card in the virtual reality retail environment(s) 120. In some embodiments, the guest can press a button on the VR motion controller 154 to grab the 3D card which enables rotation and translation of the 3D card. By grabbing the 3D card, the guest can to view additional information of the particular product or service such as a customer review score, product color options, etc. For example, the additional information of the product or service may be displayed on or adjacent to the card upon the guest using the VR motion controller 154 to grab the 3D card. In some embodiments, the card ecosystem guest interface API 130 can allow additional information to be displayed on or adjacent the 3D card in real time. The guest can use the VR motion controller 154 to rotate and move the 3D card within the virtual reality retail environment(s) 120. Grabbing a 3D card in the virtual reality retail environment(2) 120 can include In some embodiments, when a guest grabs a 3D card using the VR motion controller 154, the card ecosystem guest interface API 130 allows a 3D shipping box to be displayed above the 3D card while a 3D model of the product associated with the 3D card is being loaded in real time. Once the 3D model of the product is loaded, a small version of the 3D model is displayed above the 3D card. This small version of the 3D model can be pinned to the 3D card and can be rotated, moved and turned around with the 3D card. The card ecosystem guest interface API 130 allows a guest to transform the small version of the 3D model into a large version of the 3D model that can be interacted with (grabbed, moved, rotated, etc.) by the guest using the VR motion controller 154 within the virtual reality retail environment(s) 120. The large version of the 3D model can be sized to scale within the virtual reality retail environment(s) 120. In some embodiments, the card ecosystem guest interface API 130 allows the 3D card to be pinned to the large version of the 3D model so that it is provided adjacent to the 3D model within the virtual reality retail environment(s) 120. In some embodiments, a 3D card provided by the card ecosystem guest interface API 130 can be for a specific product or service provided by the retailer online service 110. In some embodiments, a 3D card provided by the card ecosystem guest interface API 130 can be a grouping of different products and/or services. In some embodiments, the card ecosystem guest interface API 130 can allow a guest to edit or create new 3D cards for use in the virtual reality retail environment(s) 120. The new 3D cards can include multiple products or services provided by the retailer online service 110 that are grouped together by the guest. The multiple products or services can be two or more of the same product or service provided by the retailer online service 110 and/or two more different products or services provided by the retailer online service 110. For example, a guest can create a room within the virtual reality retail environment(s) 120 and fill the room with different products offered by the retailer online service 110 and make a 3D card (through the card ecosystem guest interface API 130) for that room with information for all of the products in the room.

The product/service information API 135 is configured to communicate with the one or more database(s) 160, the virtual reality retail environment(s) 120, and the card ecosystem guest interface API 130. In particular, the product/service information API 135 is configured to receive instructions from the virtual reality retail environment(s) 120 requesting product/service data stored in the one or more database(s) 160. The product/service information API 135 is then configured to communicate with the one or more database(s) 160 to retrieve the requested product/service data and then configured to extract product/service specific information regarding the product or service and extract 3D model data in order to provide the requested product/service specific information and the 3D model data to the virtual reality retail environment(s) 120. The product/service information API 135 can also be configured to filter search results based on commands received from the guest via the virtual reality retail environment(s) 120.

In some embodiments, the product/service information API 135 is configured to receive instructions from the virtual reality retail environment(s) 120, communicate with the one or more database(s) 160 to retrieve the requested product/service specific information, and provide the requested product/service specific information to the virtual reality retail environment(s) 120 in real time. When a guest performs a search using a search tool provided by the card ecosystem guest interface API 130, the product/service information API 135 can pull real time product/service data from the one or more database(s) 160 and then transfer the data to the virtual reality retail environment(s) 120 in real time. The data retrieved by the product/service information API 135 in real time from the one or more database(s) 160 can include 3D model data used to display a 3D model of a product in the virtual reality retail environment(s) that can be interacted with by the guest.

The virtual reality retail environment(s) 120, the electronic shopping cart API 125, the card ecosystem guest interface API 130, and the product/service information API 135 may be implemented as separate hardware capable of performing different functionalities of the retailer online service 110. The virtual reality retail environment(s) 120, the electronic shopping cart API 125, the card ecosystem guest interface API 130, and the product/service information API 135 may include routines, programs, objects, components, data structures, and the like, which perform particular tasks or implement particular abstract data types. The virtual reality retail environment(s) 120, the shopping cart API 125, the card ecosystem guest interface API 130, and the product/service information API 135 may further include electronic circuitry or a combination of electronic circuitry and control programs that operate the components according to the functions described herein.

The one or more user devices 150 are configured to access the one or more virtual reality retail environments 170 via the network 180. The one or more user devices 150 are the same as or similar to aspects of the computer device 900 as shown and described in accordance with FIG. 4 below. The user device(s) 150 can include, but are not limited to, a desktop computer, a cellular/mobile phone, a tablet device, a laptop computer, video game console, etc. The one or more user devices 150 can be part of or connected to one or more input/output devices including an optional VR headset 152 and/or one or more optional motion controller(s) 154. The VR headset 152 can allow a guest to experience visual images associated with the virtual reality retail environment(s) 120. In some embodiments, the VR headset 152 can display a 3D virtual scene and can include sensors to track a user's head movement to show different portions of the virtual reality retail environment(s) 120. The one or more VR motion controller(s) 154 can allow a guest to interact with different objects within the virtual reality retail environment(s) 120. In some embodiments, the one or more motion controllers 154 can include sensors to track a user's motions (e.g., hand motions) and can include buttons and controls to move a camera or guest around the virtual reality retail environment(s) 120. In some embodiments, the one or more motion controllers 154 can allow the guest to navigate the virtual reality retail environment(s) 120 by waving the motion controller(s) 154 to create gesture commands. Also, in some embodiments, the one or more motion controllers 154 can allow the guest to navigate the virtual reality retail environment(s) 120 by allowing the guest to look at different locations within the virtual reality retail environment(s) 120 using the VR headset 152 and teleport or jump to a location the guest is looking at by using a button or control on the one or more VR controller(s) 154. In some embodiments, the one or more user devices 150 can be part of or connected to other input/output devices including, for example, goggles, other wearable computing device(s), joystick(s), etc. that may provide haptic or tactile outputs and/or feedback related to portions of the experience within the virtual reality retail environment(s) 120.

The one or more database(s) 160 is configured to store product/service data for products or services sold by the retailer online service 110. The product/service data can include product/service specific information and 3D model data. The product/service specific information can include, for example, the name of the product or service, the name of the company selling the product or service, the price of the product or service, color options for the product or service, customer review(s) of the product or service, specific details of the product or service, warranty information of the product or service, size and/or weight of the product, etc. The product/service specific information can also include various pictures of the product or service.

As noted above, the one or more database(s) 160 is also configured to store 3D model data of any products or services sold by the retailer online service 110. In some embodiments, the 3D model data can be used for rendering a 3D model of a product for display on a two-dimensional display (e.g., a computer monitor, a tablet display, a mobile phone display, etc.) and in a 3D virtual reality retail environment. In some embodiments, the 3D model data for a product can be stored in a 3D model package file. The 3D model package file can store 3D model data for multiple versions of the same product. For example, the 3D model package file can store 3D model data for 3D models of the same product with different levels of fidelity (i.e., levels of detail). In some embodiments, the 3D model package file can include data, for example, for seven different 3D model versions of the same product, with each of the seven versions having a different level of fidelity. The memory size and processing requirements for rending the 3D model data into a 3D model for each version of the product can vary based on the level of fidelity. For example, higher fidelity versions of the 3D model can require more memory and processing requirements than a lower fidelity version of the same 3D model.

In some embodiments, the product/service data stored in the one or more database(s) 160 can be used in multiple platforms of the retailer online service 110 including, for example, the virtual reality retail environment(s) 120 and two dimensional retail applications (e.g., retailer websites, retailer shopping apps, etc.). Accordingly, the product/service data can be used across different platforms of the retailer online service 110 without having to create different assets or files to accommodate each retailer platform.

In some embodiments, the virtual reality retail environment(s) 120 can display scaled 3D model(s) of products or services available for purchase from the retailer online service 110. The virtual reality retail environment(s) 120 can automatically and continuously select one of a plurality 3D model versions as a scaled 3D model for display based on a distance from a guest avatar within the virtual reality retail environment(s) 120 and the scaled 3D model. For example, a higher fidelity 3D model version of the plurality of 3D model versions can be selected for display as the scaled 3D model when the guest avatar is within a predefined threshold distance from the scaled 3D model and a lower fidelity 3D model version of the plurality of 3D model versions can be selected for display on the display device as the scaled 3D model when the guest avatar is outside of the predefined threshold distance from the scaled 3D model. In some embodiments, the virtual reality retail environment(s) 120 can automatically select one of the plurality of 3D model versions to display as a miniature 3D model. In some embodiments, the 3D model version selected for the miniature 3D model version may not be the highest fidelity level 3D model version of the plurality of 3D model versions.

FIG. 2 illustrates a flowchart of a method 200 for presenting a card ecosystem guest interface in virtual reality retail environment(s). In some embodiments, the method 200 can be implemented using the system 100 shown in FIG. 1. The method 200 can allow one or more guests to navigate products and services provided by a retailer online service (e.g., the retailer online service 110 shown in FIG. 1) within virtual reality retailer environment(s) (e.g., the virtual reality retail environment(s) 120 shown in FIG. 1) in an easy, accessible, and entertaining manner. In particular, the method 200 can provide a card ecosystem guest interface that allows guests to search, filter and examine different product and service offerings provided by the retailer online service in virtual reality retailer environments. For illustrative purposes, the method 200 is described below with respect to one non-limiting example of how a card ecosystem guest interface can be implemented in a virtual reality retail environment as provided in the screenshots shown in FIGS. 3A-V.

At 205, a retailer online service receives a command over a network (e.g., the network 180 shown in FIG. 1) from a guest experiencing the virtual reality retail environment to present a card ecosystem guest interface within the virtual reality retail environment. In some embodiments, the guest can send a command through a user device (e.g., the user device(s) 150 shown in FIG. 1) using, for example, an input/output device (e.g., the VR motion controller 154 shown in FIG. 1) connected to the user device. For example, a guest can press a button or control on a VR motion controller to initiate display of the card ecosystem guest interface. The method 200 then proceeds to 210.

FIG. 3A illustrates a screenshot of a virtual reality retail environment 300 that can present a card ecosystem guest interface upon receiving a command to initiate display of the card ecosystem guest interface. The virtual reality retail environment 300 includes a guest avatar 305 that provides a visual representation of the guest within the virtual reality retail environment 300. The guest avatar 305 includes a virtual representation of an input/output device 310 being used by the guest (e.g., a virtual representation of the VR motion controller(s) 154). As discussed above at 205, the guest can send a command using an input/output device to initiate display of the card ecosystem guest interface within the virtual reality retail environment 300.

Returning to FIG. 2, at 210, a card ecosystem guest interface API (e.g., the card ecosystem guest interface 130) causes, via a display device (e.g., the VR headset 152 shown in FIG. 1), presentation of a card ecosystem guest interface within the virtual reality retail environment. In some embodiments, card ecosystem guest interface is aligned within a field of view of a guest within the virtual reality retail environment. That is, the card ecosystem guest interface can be displayed anywhere in the virtual reality retail environment that the guest is looking. The card ecosystem guest interface can remain aligned within the field of view of the guest as the guest moves or looks around the virtual reality retail environment. Initially, the card ecosystem guest interface can display a keyboard in which the guest can input, via the input/output device, one or more search terms of products or services to search. The keyboard can be aligned within the field of view of the guest within the virtual reality retail environment.

Figure 3B:
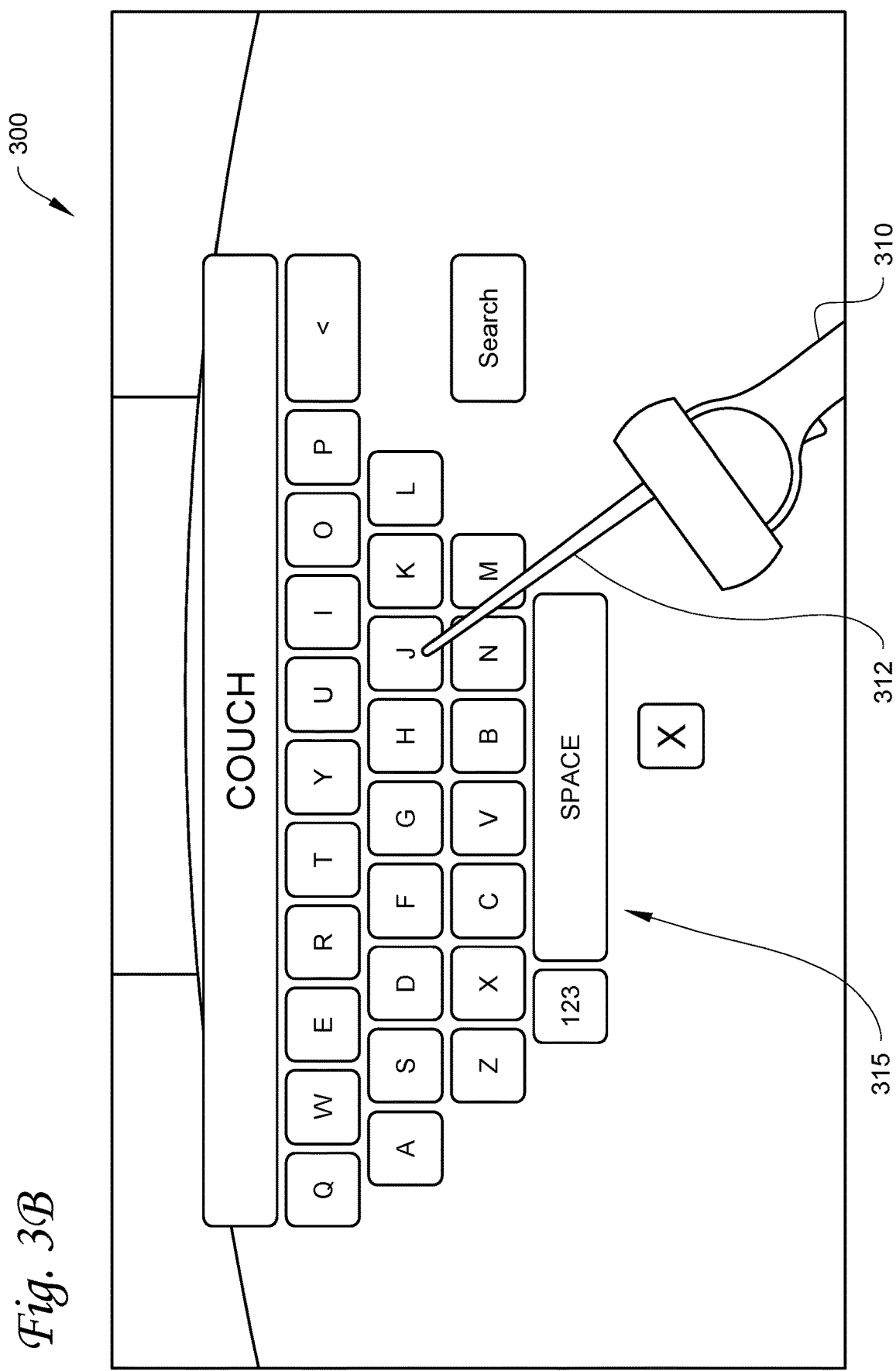
FIG. 3B illustrates a screenshot of a portion of the virtual reality retail environment showing a search tool of a card ecosystem guest interface, according to one embodiment.

FIG. 3B illustrates a screenshot of the virtual reality retail environment 300 in which an initial card ecosystem guest interface 302 is shown upon the guest sending a command to initiate the card ecosystem guest interface 302. In particular, upon the guest initiating the card ecosystem guest interface 302, the virtual reality retail environment 300 displays a keyboard 315 aligned within the field of view of the guest. The guest can use the virtual representation of the VR motion controller 310 (using the guest's input/output device) to input one or more search terms into the keyboard 315 to search for products/services available for purchase from the retailer online service. In this example, the guest has used the keyboard 315 to type in the search term "couch".

Returning to 210, upon entering the search term(s), the card ecosystem guest interface API can identify relevant (or potentially relevant) products or services available to purchase from the retailer online service. Each of the relevant (or potentially relevant) products or services can then be displayed as a 3D card within the virtual reality retail environment. In some embodiments, the card ecosystem guest interface API can employ a product/service information API (e.g., the product/service information API 135) to identify and filter relevant (or potentially relevant) products or services available to purchase from the retailer online service. The product/service information API can communicate, via the network, with one or more databases (e.g., the database(s) 160 shown in FIG. 1) to search for relevant (or potentially relevant) products or services available to purchase. The database(s) can provide product/service data for the identified relevant (or potentially relevant) products or services to the product/service information API. The product/service information API can then extract and provide the product/service specific information to the virtual reality retail environment(s) for display on one or more 3D cards. The product/service specific information can include, for example, a picture of a product/service available for purchase from the retailer online service; a product name of the product/service; a company name of a company associated with the product/service; a price of the product; product size dimensions; etc. Accordingly, the retailer online service, the product/service information API, the virtual reality retail environment and the database(s) are communicating in real time and thereby allowing the product/service specific information incorporated into the one or more 3D cards to be obtained and the one or more 3D cards to be displayed within the virtual reality retail environment in real time. Thus, the virtual reality retail environment is not required to load static data regarding products/services provided by the retailer online service when the virtual reality retail environment is opened.

Figure 3C:
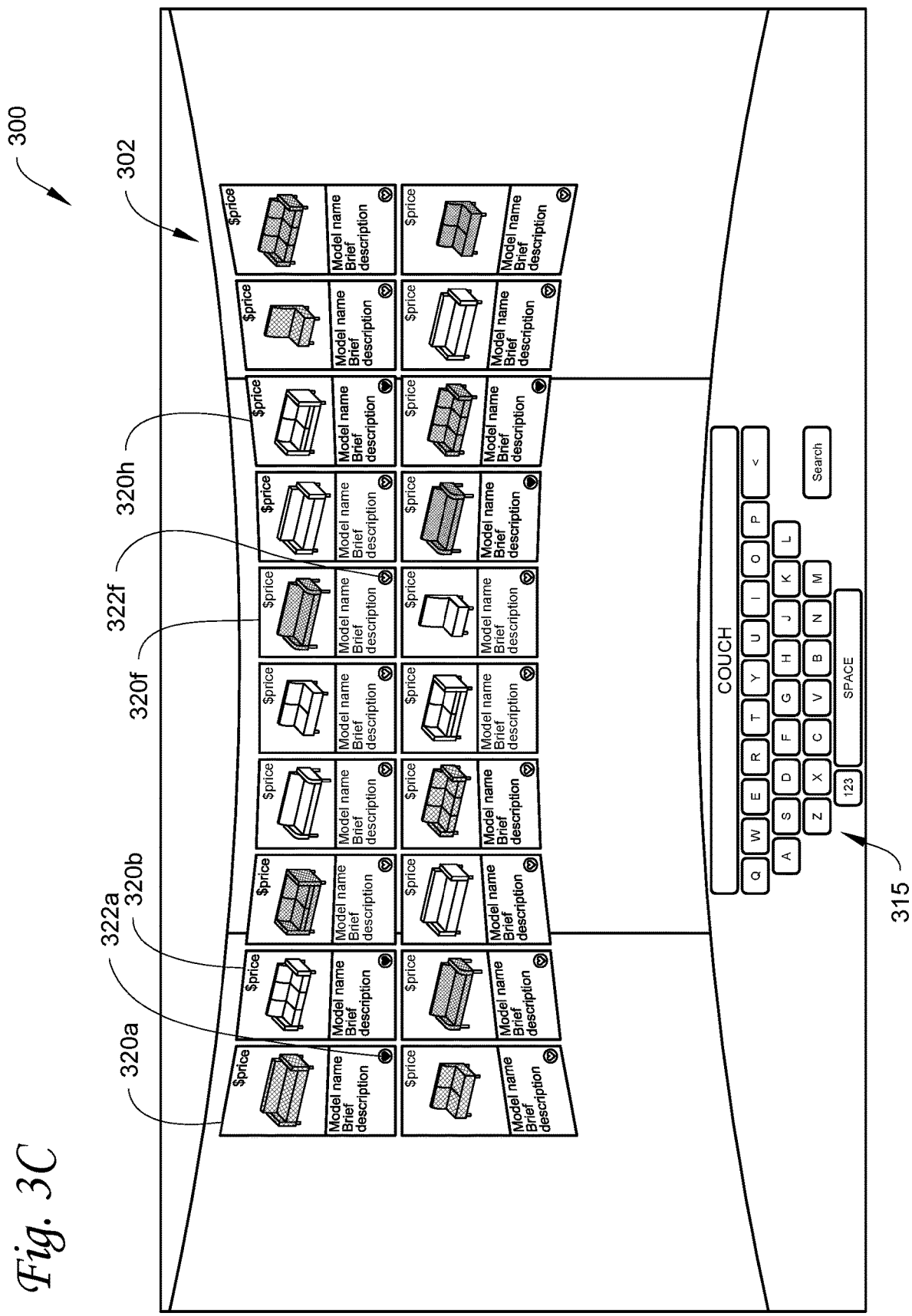
FIG. 3C illustrates a screenshot of a portion of the virtual reality retail environment showing the search tool and a plurality of 3D cards, according to one embodiment.

The one or more 3D cards can be displayed, for example, in a table format and can be aligned within the field of view of the guest within the virtual reality retail environment. For illustrative purposes, FIG. 3C shows a screenshot of the virtual reality retail environment 300 in which the card ecosystem guest interface 302 is shown with the keyboard 315 and a plurality of 3D cards 320. Each of the 3D cards 320 displays a guest action 322 and at least some product/service specific information including: a picture of the product/service available for purchase from the retailer online service; a product name of the product; a company name of a company associated with the product/service; and a price of the product/service. It will be appreciated that in some embodiments, the 3D cards may not be able to display all of the product/service specific information obtained from the database (e.g., product size dimensions). The product/service specific information not shown in the 3D cards may be considered additional information. The guest action 322 shown in FIG. 3C is a make favorite action that when selected by the guest using the input/output device 305 saves the product/service associated with the particular 3D card as a favorite for the guest within the retailer online service. In this example, the search term "couch" was entered by the guest and the card ecosystem guest interface 302 has provided search results for different couches available for purchase from the retailer online service.

Figure 3D:
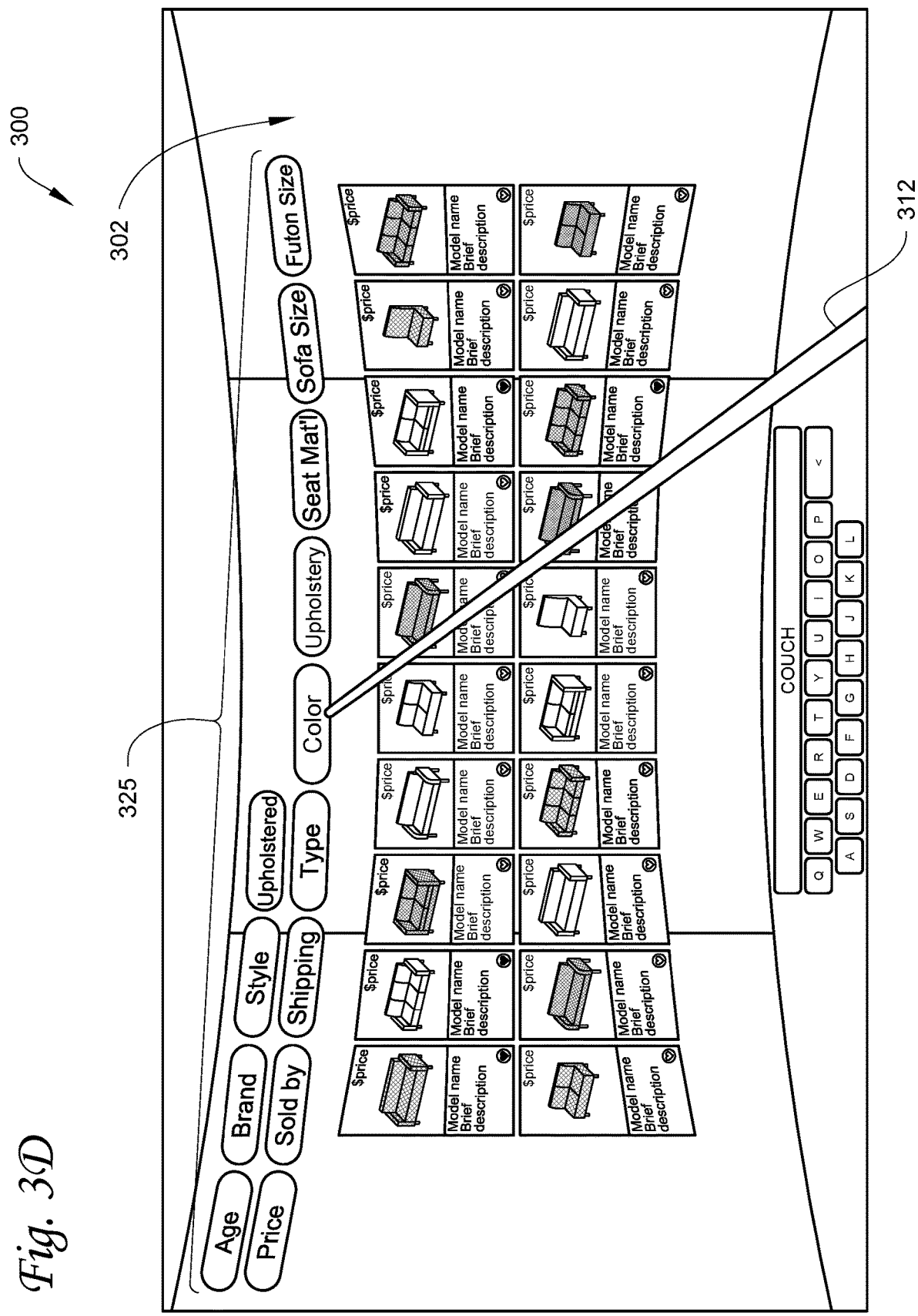
FIG. 3D illustrates a screenshot of a portion of the virtual reality retail environment showing the search tool, the plurality of 3D cards, and filtering options, according to one embodiment.

The card ecosystem guest interface can also include filtering options to allow the guest to narrow the search results provided in the table of 3D cards. The card ecosystem guest interface API can filter the search results based on input received from the guest. As shown in FIG. 3D, in addition to showing plurality of 3D cards 320, the card ecosystem guest interface 302 also displays a plurality of filtering options 325 available to the guest. The filtering options 325 are relevant to the search term "couch" and include, for example, an "Age" option, a "Brand" option, a "Décor Style" option, an "Upholstered" option, a "Price" option, a "Sold By" option, a "Shipping and Pickup" option, a "Type" option, a "Color" option, an "Upholstry" option, a "Seat Material" option, a "Sofas Size" option, a "Futons Size" option, etc. The guest can use the pointer 312 to select a desired filtering option 325 to narrow the search results and thereby the number of 3D cards displayed by the card ecosystem guest interface 302.

Figure 3E:
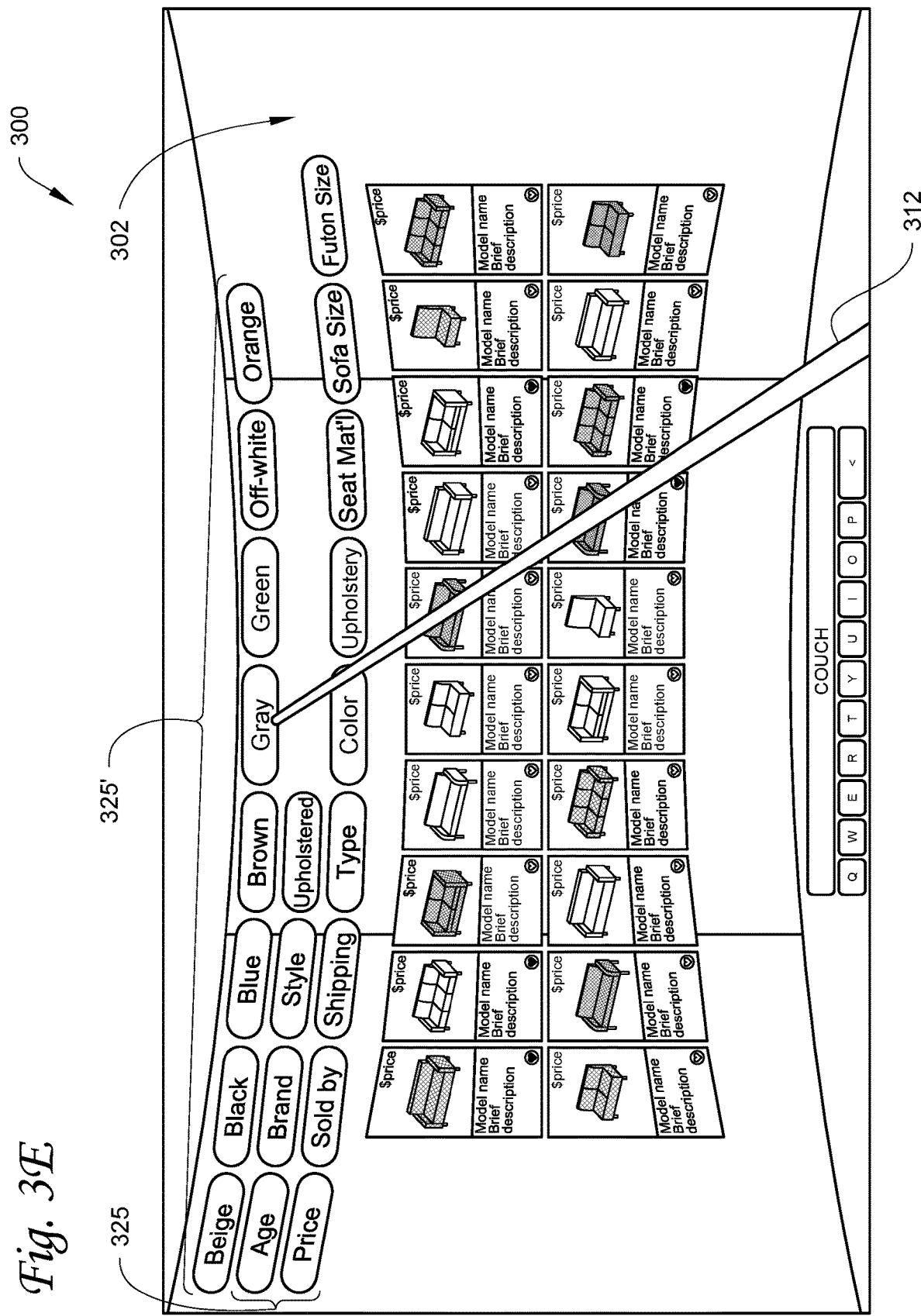
FIG. 3E illustrates a screenshot of a portion of the virtual reality retail environment showing the search tool, the plurality of 3D cards, filtering options, and filtering selections, according to one embodiment.
Figure 3F:
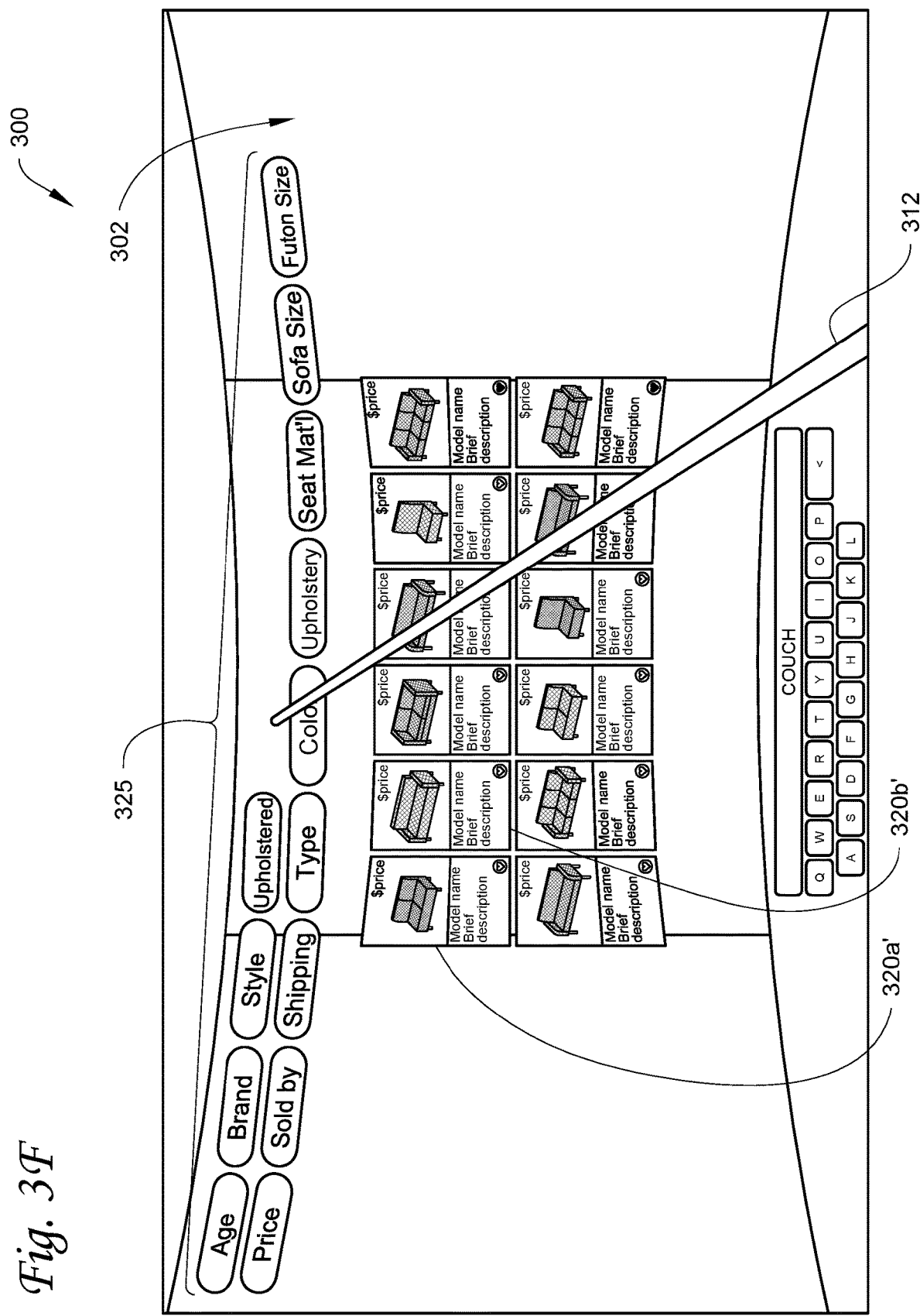
FIG. 3F illustrates a screenshot of a portion of the virtual reality retail environment showing the search tool, a plurality of filtered 3D cards, and the filtering options, according to one embodiment.

As shown in FIG. 3E, upon the guest using the pointer 312 to select a desired filtering option 325 (in this case the "Color" option), the card ecosystem guest interface 302 displays a plurality of filter selection options 325' relevant to the particular filtering option 325 selected. In this example, FIG. 3E displays different color options 325' the guest can select from to narrow the search results including, for example, a "Beige" option, a "Black" option, a "Blue" option, a "Brown" option, a "Gray" option, a "Green" option, an "Off-white" option, an Orange" option, etc. In this example, the pointer 312 has selected the "Gray" option. Accordingly, in FIG. 3F, the card ecosystem guest interface 302 displays a plurality of filtered 3D cards 320' that display search results for different couches available for purchase from the retailer online service that identify as having a gray color option.

Figure 3G:
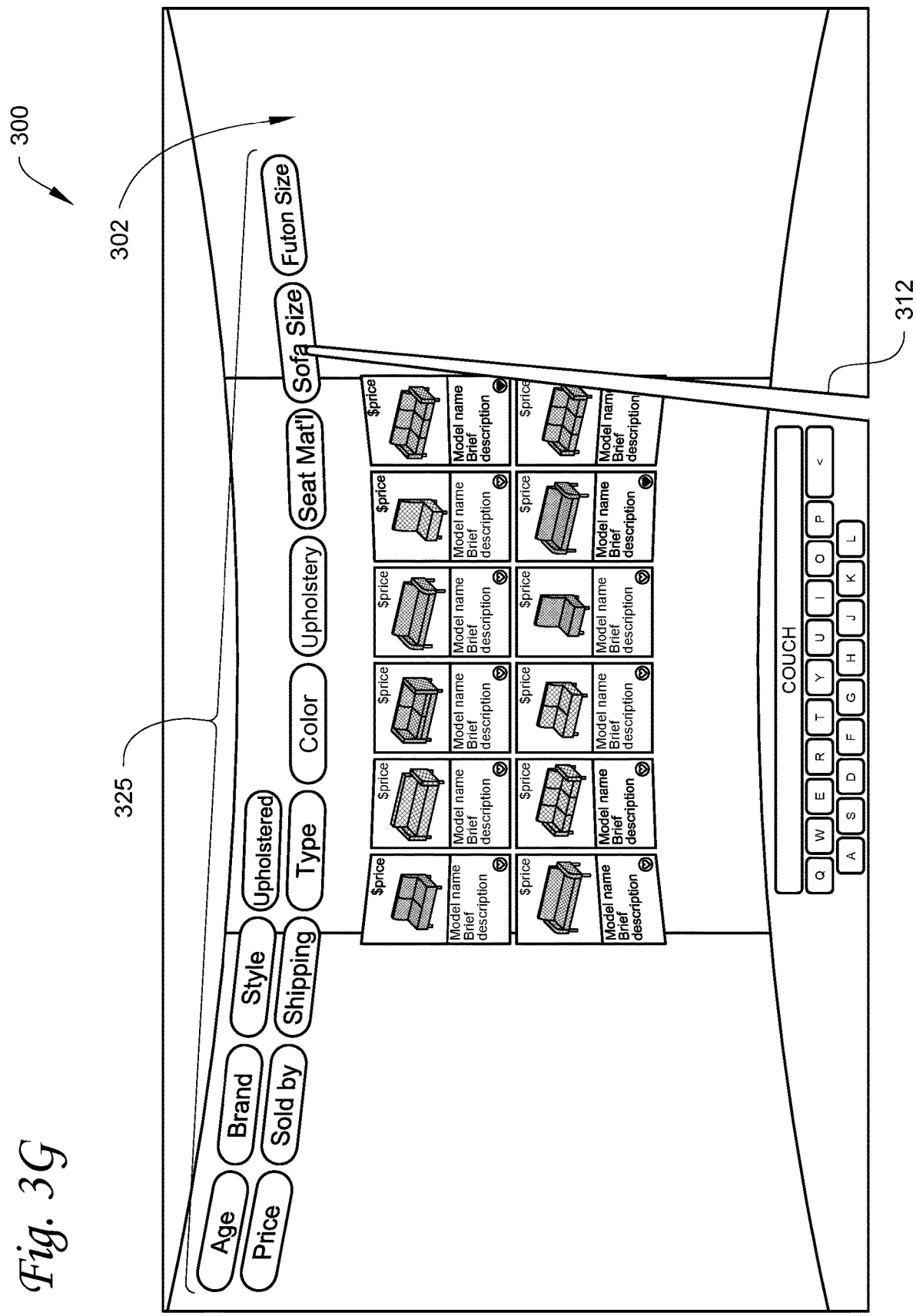
FIG. 3G illustrates a screenshot of a portion of the virtual reality retail environment showing the plurality of filtered 3D cards, and filtering options, according to one embodiment.
Figure 3H:
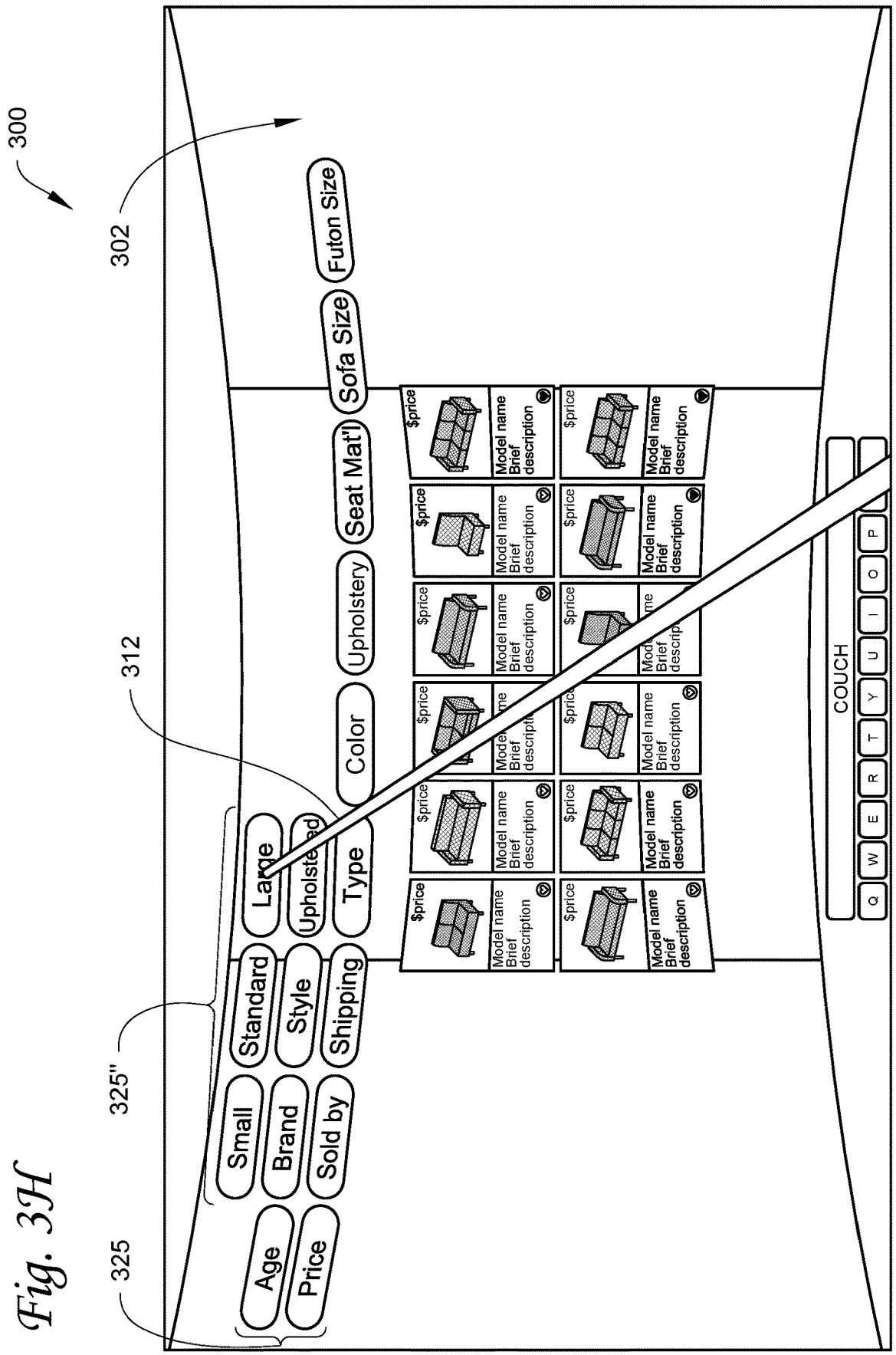
FIG. 3H illustrates a screenshot of a portion of the virtual reality retail environment showing the search tool, the plurality of filtered 3D cards, the filtering options, and different filtering selections, according to one embodiment.
Figure 3I:
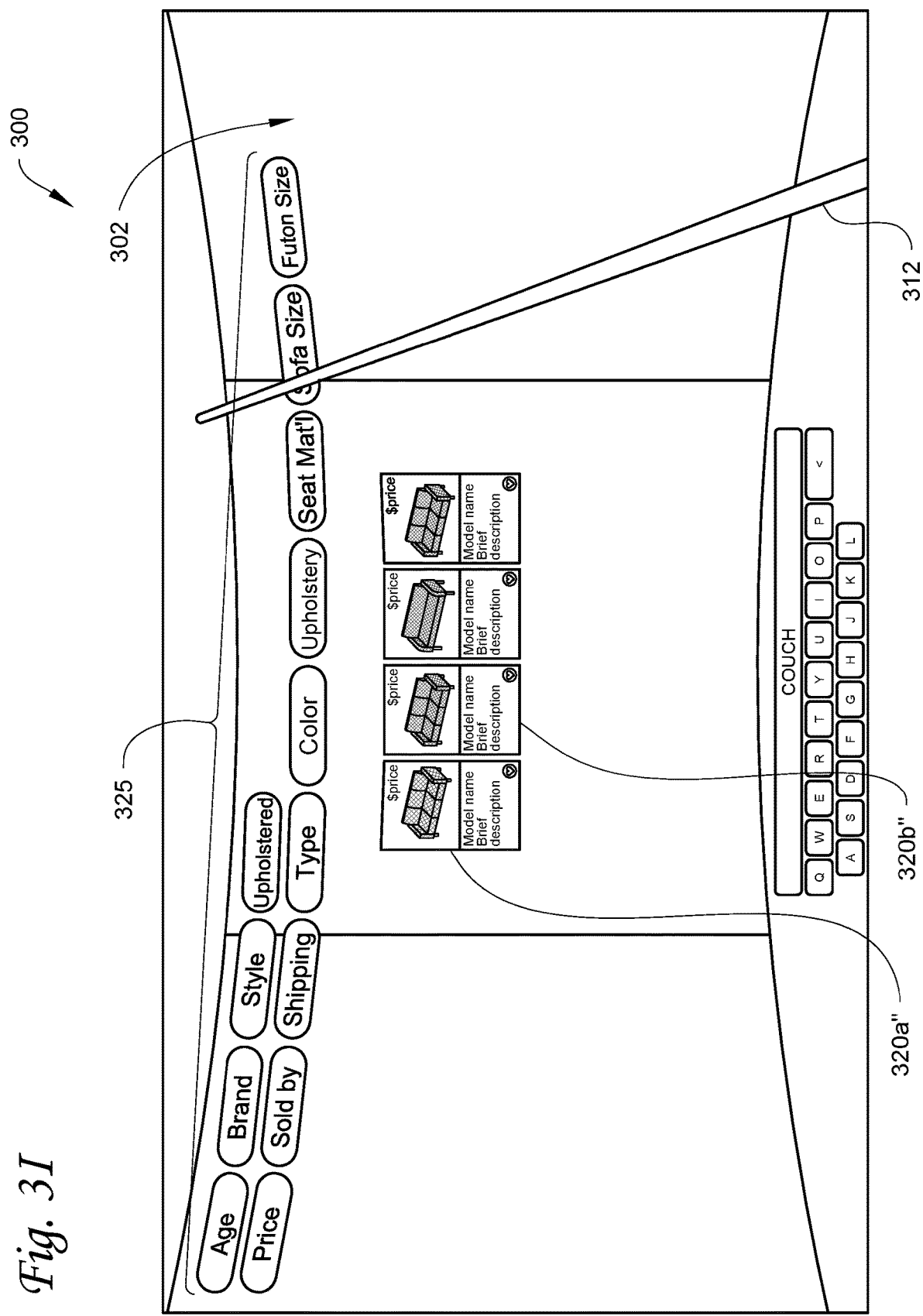
FIG. 3I illustrates a screenshot of a portion of the virtual reality retail environment showing the search tool, a plurality of further filtered 3D cards, and filtering options, according to one embodiment.

The guest can continue to filter search results using the filtering options 325. For example, as shown in FIG. 3G, the guest can use the pointer 312 to select another filtering option to narrow the search results and thereby the number of 3D cards displayed by the card ecosystem guest interface 302. As shown in FIG. 3H, upon the guest using the pointer 312 to select another desired filtering option 325 (in this case the "Sofa Size" option), a plurality of different filter selection options 325" relevant to the particular filtering option 325 selected. In this example, FIG. 3H displays different sofa size options 325" the guest can select from to narrow the search results including, for example, a "small sofa size" option, a "standard sofa size option", a "large sofa size" option, etc. In this example, the pointer 312 has selected the "Large" option. Accordingly, in FIG. 3I, the card ecosystem guest interface 302 displays a plurality of further filtered 3D cards 320''' that display search results for different couches available for purchase from the retailer online service that identify as having a gray color option and a large sofa size.

The guest can continue to filter and search for products/services via the card ecosystem guest interface 302 as desired. The method 200 then proceeds to 215.

Figure 3J:
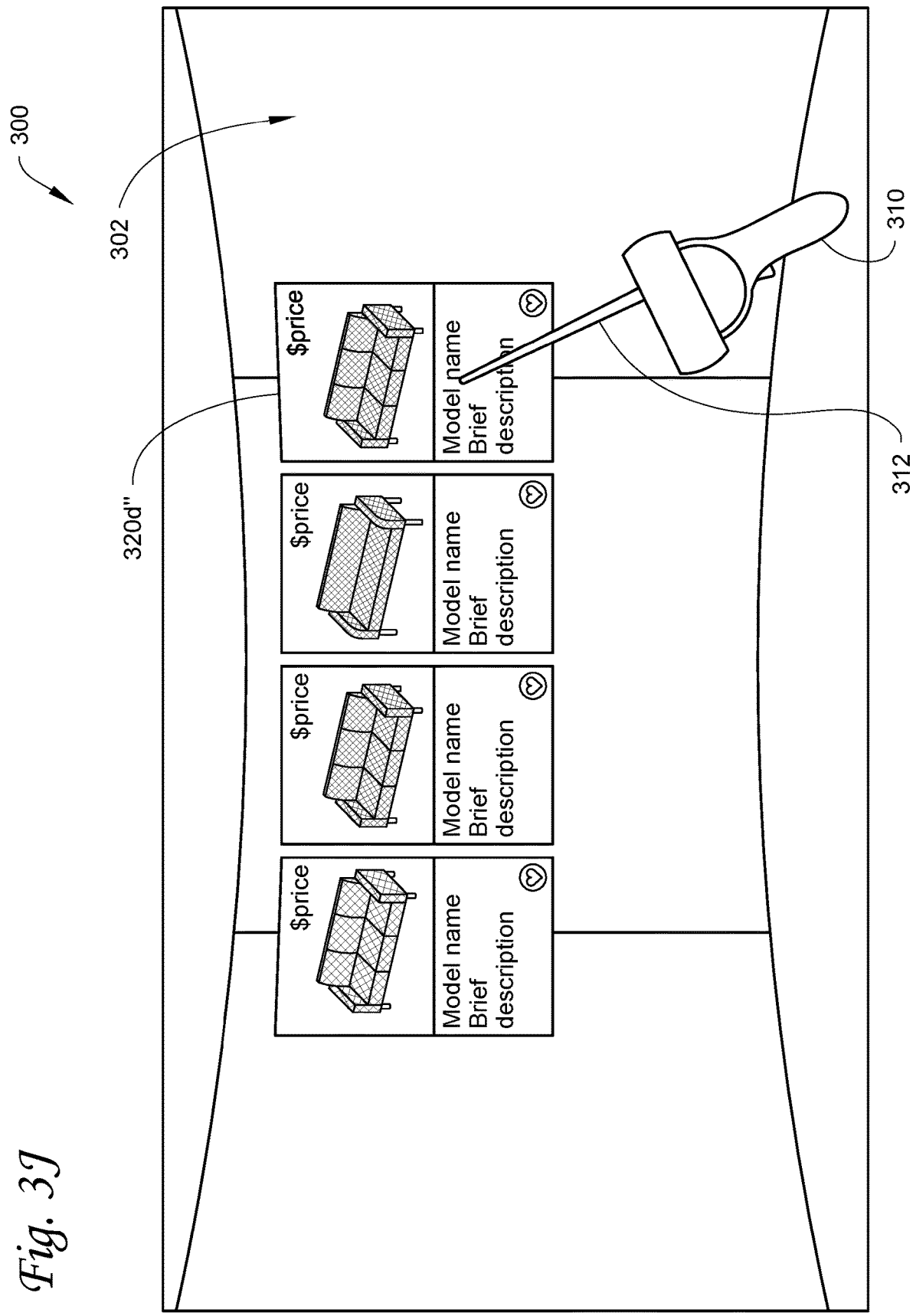
FIG. 3J illustrates a screenshot of a portion of the virtual reality retail environment showing the plurality of further filtered 3D cards, and a virtual representation of a motion controller, according to one embodiment.

At 215, the retailer online service receives, via the input/output device, a selection command to select one of the plurality of 3D cards within the virtual reality retail environment. For example, the guest can use a VR motion controller to point to and grab one of the 3D cards being displayed. In some embodiments, the card ecosystem guest interface can allow the guest to select one of the 3D cards using the input/output device. As shown in FIG. 3J, the guest can use the pointer 312 to point to a desired 3D card 320d" and input a selection command into the input/output device to instruct the virtual representation of the motion controller 310 to grab the desired 3D card 320". In some embodiments, once a desired 3D card is selected, the desired 3D card can remain in the virtual reality retail environment until deleted by a guest via, for example, the VR motion controller. Upon receiving the selection command, the method 200 then proceeds concurrently to 220, 225, 230 and 235.

Figure 3K:
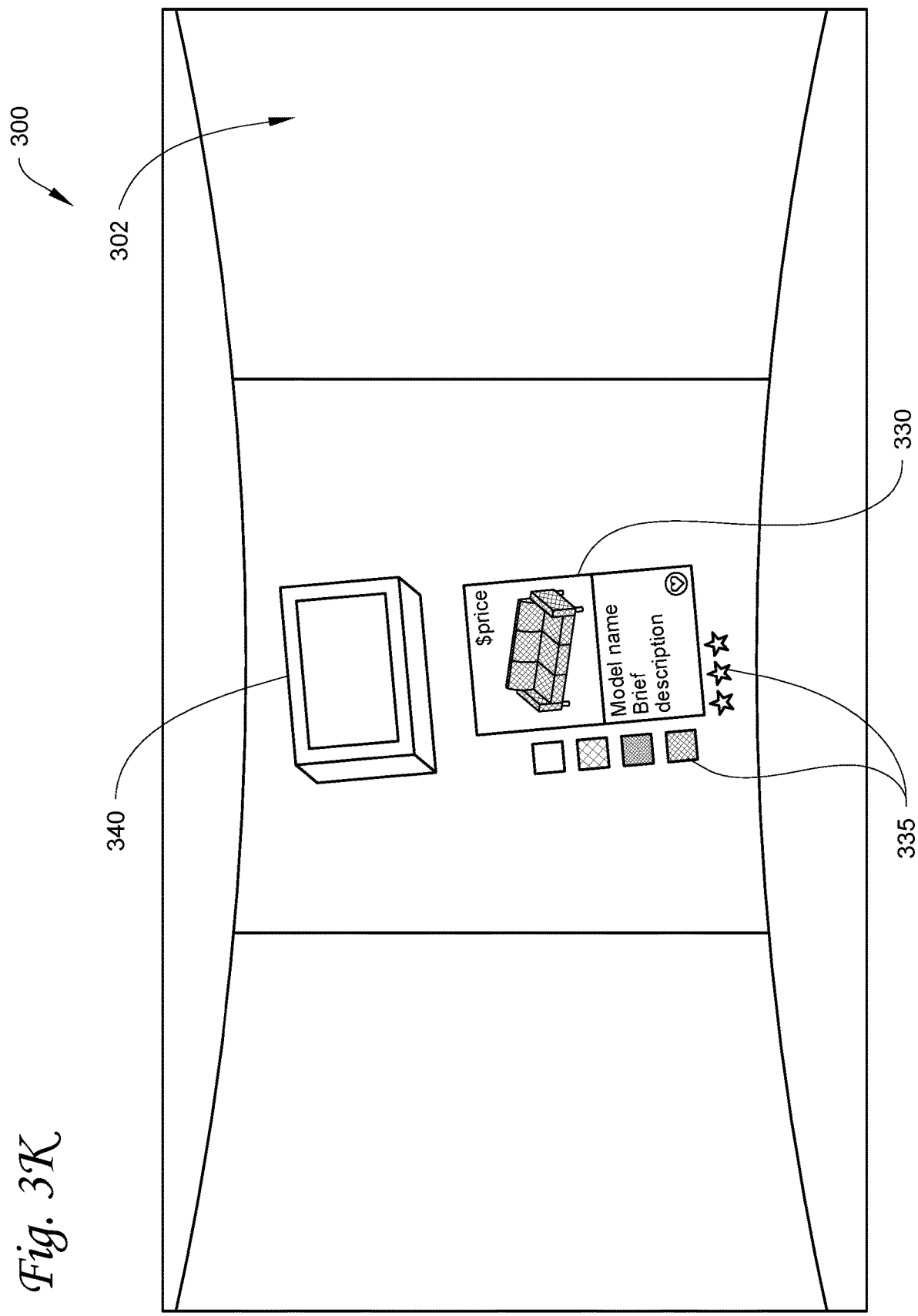
FIG. 3K illustrates a screenshot of a portion of the virtual reality retail environment showing a selected 3D card, according to one embodiment.

At 220, the card ecosystem guest interface API causes, via the display device, presentation of the selected 3D card to be displayed (e.g., centered) within the field of view of the guest. That is, the selected 3D card can be displayed anywhere in the virtual reality retail environment that the guest is looking. The selected 3D card can remain aligned within the field of view of the guest as the guest moves or looks around the virtual reality retail environment. In some embodiments, the one or more unselected 3D cards presented at 210 may remain within the virtual reality retail environment, but these 3D cards no longer remain aligned within the field of view of the guest as the guest moves or looks around the virtual reality retail environment. In some embodiments, the one or more unselected 3D cards presented at 210 may be removed from the virtual reality retail environment until the retailer online service receives a new command from the guest for presenting the card ecosystem guest interface. The guest can also move and rotate the selected 3D card within the field of view of the guest within the virtual reality retail environment. For example, FIG. 3K illustrates a selected 3D card 330 that remains aligned within the field of view of the guest.

At 225, the card ecosystem guest interface API causes, via the display device, presentation of additional information on or adjacent the selected 3D card within the virtual reality retail environment. The additional information can include, for example, a customer review score of the product/service associated with the selected 3D card, product color options, etc. In some embodiments, the additional information can be data of the product/service specific information obtained by the product/service information API at 210 but not provided on the one or more 3D cards displayed at 210. In some embodiments, the additional information can be obtained in real time from the product/service information API (which retrieves the additional information from the database(s) in real time). The additional information can be anchored to the selected 3D card such that the additional information can remain aligned with the selected 3D card as the guest moves or looks around the virtual reality retail environment. The selected 3D card 330 shown in FIG. 3K includes product color options available for the product/service (in this case couch) and a customer review score as additional information 335. In this example, the color options additional information 335 are anchored to the left side of the selected 3D card 320 and the customer review score additional information 335 is anchored below the selected 3D card 330.

At 230, the retailer online service obtains and loads a miniature 3D model of the product or service to be displayed adjacent the selected 3D card within the virtual reality retail environment upon receipt of the selection command. In some embodiments, the product/service information API can be employed to communicate, via the network, with one or more databases to retrieve a 3D model package file associated with the selected 3D card. In other embodiments, the miniature 3D model can be part of a 3D model package file included with the product/service specific information obtained by the product/service information API at 210. In some embodiments, the miniature 3D model can be part of a 3D model package file obtained in real time from the product/service information API (which retrieves the additional information from the database(s) in real time). For example, the product/service data retrieved from the database(s) at 210 can also include a 3D model package file. The 3D package model file can include 3D model data for rendering a plurality of 3D model versions of the product/service. Each of the plurality of 3D model versions can have a different level of fidelity. In some embodiments, the 3D model package file can include data, for example, for seven different 3D model versions of the same product, with each of the seven versions having a different level of fidelity. Also, the plurality of 3D model versions of the product/service can be used to display a miniature 3D model and a scaled 3D model, each having a different level of fidelity.

At 235, the card ecosystem guest interface causes, via the display device, presentation of a shipping box adjacent the selected 3D card within the virtual reality retail environment. The shipping box can be anchored to the selected 3D card such that the shipping box can remain aligned with the selected 3D card as the guest moves or looks around the virtual reality retail environment. The shipping box can remain adjacent the selected 3D card while the retailer online service is obtaining and loading a miniature 3D model of the product or service at 230. FIG. 3K shows a shipping box 340 anchored above the selected 3D card 330. The method 200 then proceeds to 240.

At 240, the card ecosystem guest interface API causes, via the display device, replacement of the shipping box with a presentation of the miniature 3D model adjacent the selected 3D card within the virtual reality retail environment. The presentation of the miniature 3D model occurs upon the miniature 3D model being loaded in real time within the virtual reality retail environment. The miniature 3D model can be anchored to the selected 3D card such that the miniature 3D model can remain aligned with the selected 3D card as the guest moves or looks around the virtual reality retail environment. In some embodiments, the virtual reality retail environment can automatically select one of the plurality of 3D model versions to display as the miniature 3D model. In some embodiments, the 3D model version selected for the miniature 3D model version may not be the highest fidelity level 3D model version of the plurality of 3D model versions.

Figure 3L:
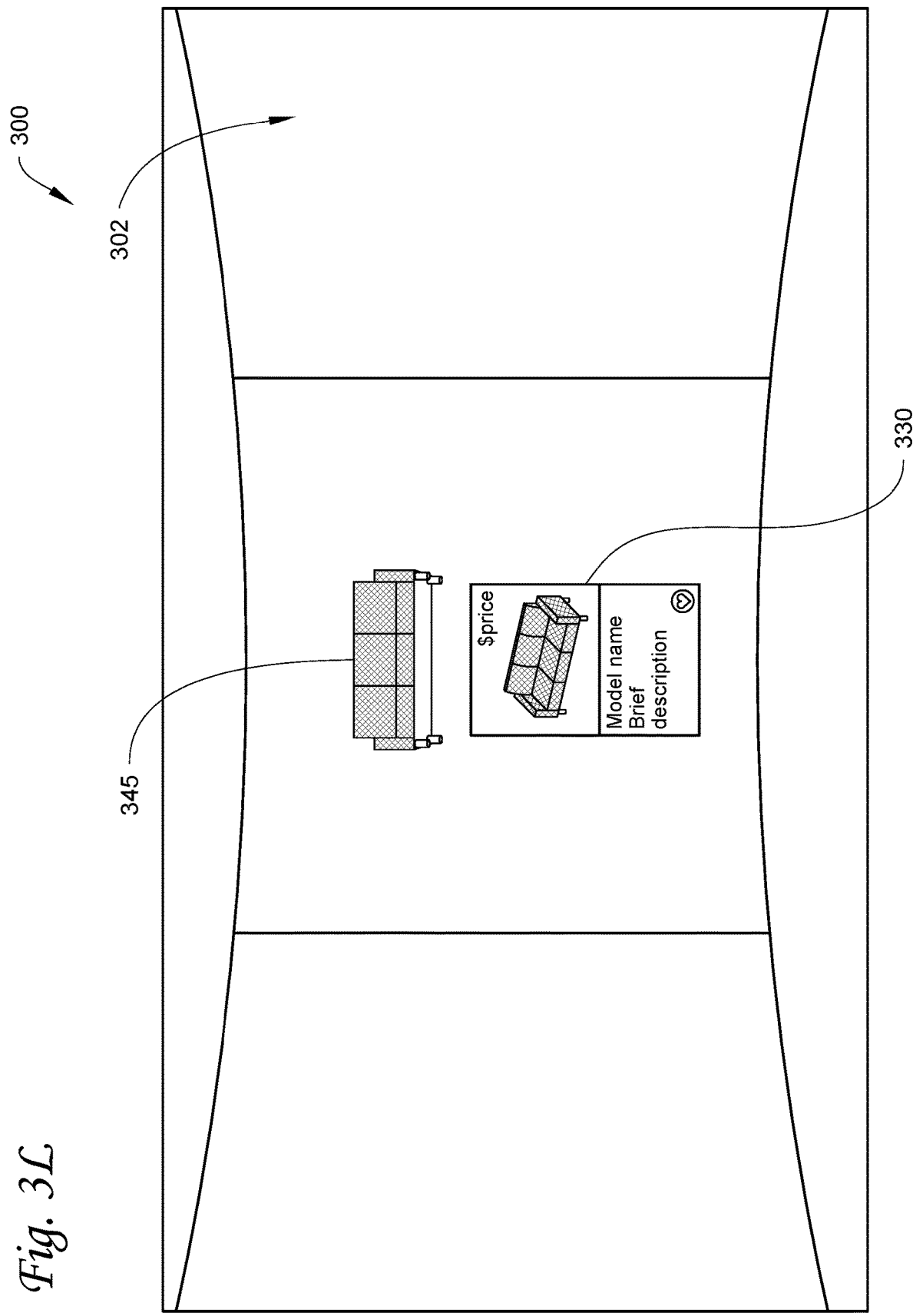
FIG. 3L illustrates a screenshot of a portion of the virtual reality retail environment showing a selected 3D card with a miniature 3D model, according to one embodiment.

For example, FIG. 3L illustrates the selected 3D card 330 that remains aligned within the field of view of the guest that includes a miniature 3D model 345 of the product/service (in this case couch) associated with the selected 3D card 330. The miniature 3D model 345 is anchored above the selected 3D card 330. As shown in FIG. 3M, the guest can move and rotate the selected 3D card 330 within the virtual reality retail environment 300 and the miniature 3D model 345 remains anchored to the selected 3D card 330. This can allow the guest to view different sides of the miniature 3D model 345. The method 200 then proceeds to 245.

At 245, the card ecosystem guest interface API receives a generate command over the network from the guest to generate a scaled 3D model of the product or service associated with the selected 3D card within the virtual reality retail environment. The scaled 3D model of the product/service can be scaled to a true size of the product/service within the virtual reality retail environment. In some embodiments, the guest can send a command through the user device using, for example, the input/output device connected to the user device. For example, a guest can press a button or control on the VR motion controller to initiate display of the scaled 3D model of the product or service. The method 200 then proceeds to 250.

At 250, the card ecosystem guest interface API causes, via the display device, presentation of the scaled 3D model of the product or service associated with the selected 3D card within the virtual reality retail environment. This can include the card ecosystem guest interface obtaining and loading the scaled 3D model from the 3D model package file. In some embodiments, the presentation of the scaled 3D model occurs upon the scaled 3D model being loaded in real time within the virtual reality retail environment.

In some embodiments, the virtual reality retail environment can automatically and continuously select one of the plurality 3D model versions as a scaled 3D model for display based on, for example, a distance from the guest avatar within the virtual reality retail environment and the scaled 3D model. For example, a higher fidelity 3D model version can be dynamically selected for display as the scaled 3D model when the guest avatar is within a predefined threshold distance from the scaled 3D model and a lower fidelity 3D model version of the plurality of 3D model versions can be dynamically selected for display on the display device as the scaled 3D model when the guest avatar is outside of the predefined threshold distance from the scaled 3D model.

The scaled 3D model can remain aligned within the field of view of the guest as the guest moves or looks around the virtual reality retail environment. The selected 3D card can be anchored to the scaled 3D model such that the selected 3D card can remain aligned with the scaled 3D model as the guest moves or looks around the virtual reality retail environment. The scaled 3D model and the selected 3D card can then remain within the virtual reality retail environment.

It will be appreciated that the virtual reality retail environment can automatically and continuously select one of the plurality of 3D model versions to present on the display device as the scaled 3D model based on a distance between a guest avatar of the guest within the virtual reality retail environment and the scaled 3D model. That is, the virtual reality retail environment can determine which 3D model version to render based on, for example, the distance of the guest avatar to the 3D model within the virtual reality retail environment. For example, if the guest avatar is close to the 3D model within the virtual reality retail environment (e.g., within a predefined threshold distance), the virtual reality retail environment can load a 3D model version that has a higher fidelity (i.e., higher level of detail). If the guest avatar is far away from the 3D model within the virtual reality retail environment (e.g., outside of a predefined threshold distance), the virtual reality retail environment can load a 3D model version with a lower fidelity (i.e., lower level of detail). It will be appreciated that different 3D model versions with different levels of fidelity can require different levels of computing resources to render within the virtual reality retail environment. For example, a higher fidelity version of the 3D model may have a greater file size and require more computing resources than a lower fidelity 3D model as the higher fidelity version of the 3D model has more detailed information of the model to be rendered.

Figure 3N:
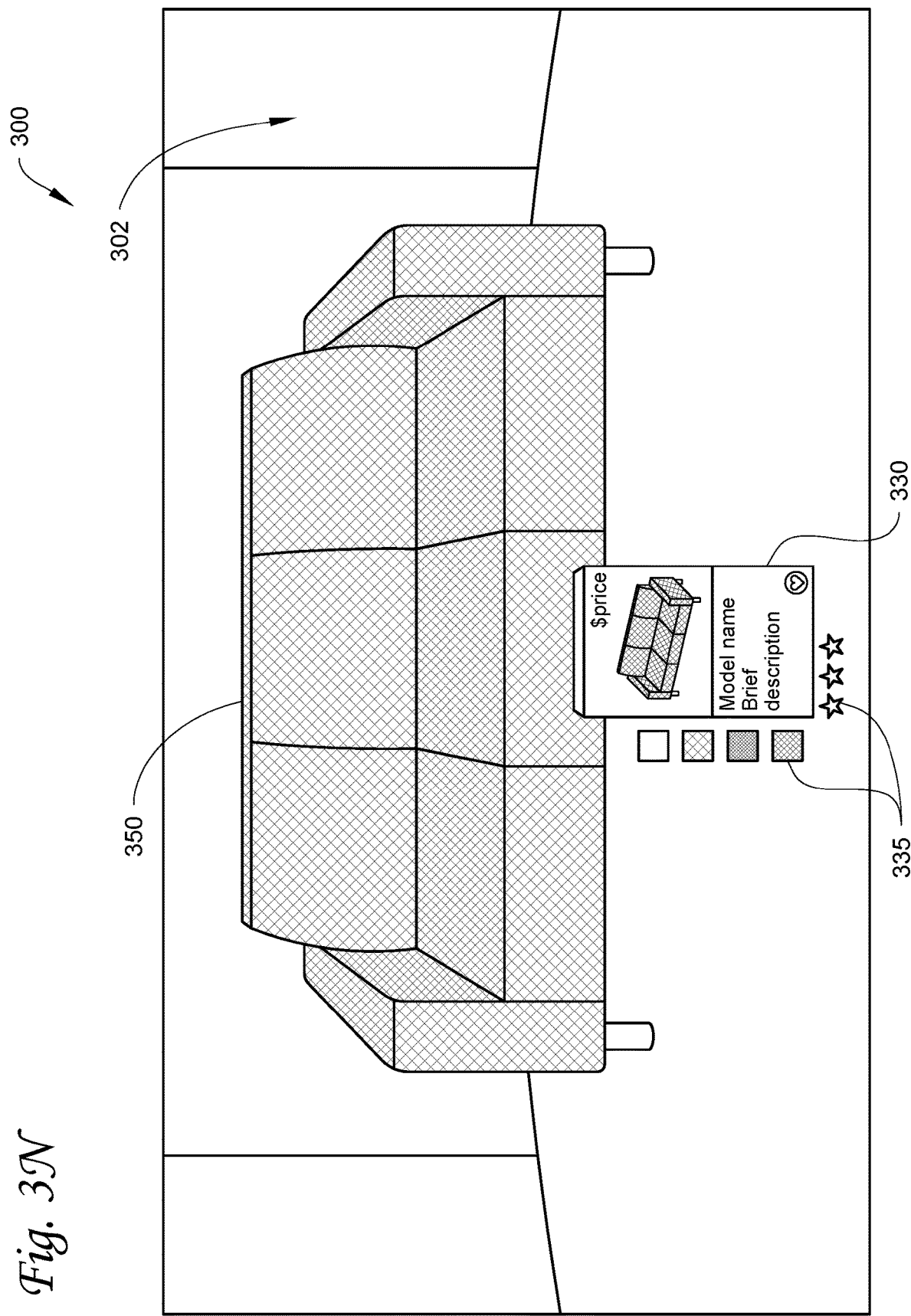
FIG. 3N illustrates a screenshot of a portion of the virtual reality retail environment showing a scaled 3D model and the selected 3D card, according to one embodiment.
Figure 30:
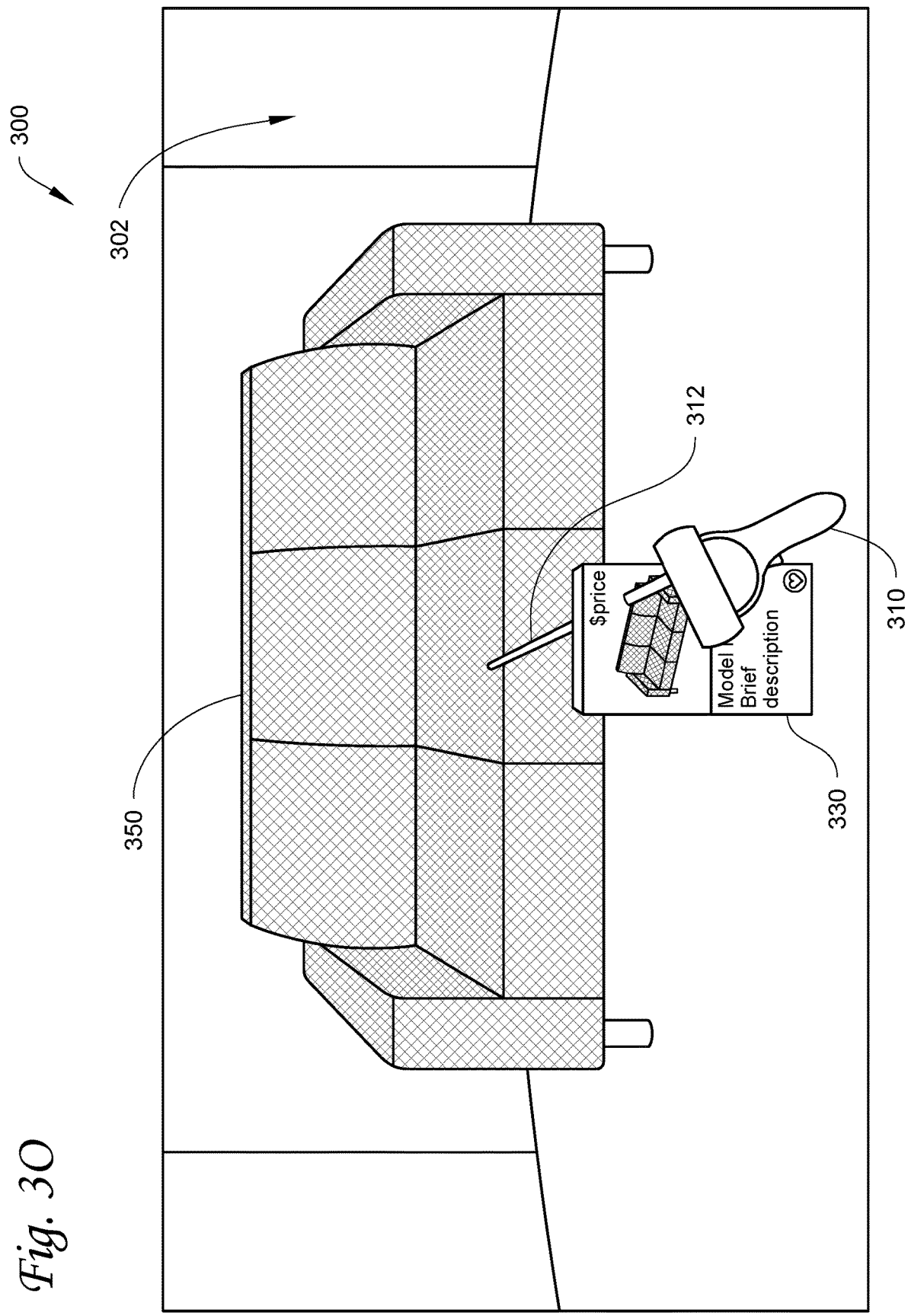

For example, FIG. 3N illustrates a scaled 3D model 350 of the product/service associated with the selected 3D card 330 (in this case a couch). The scaled 3D model 350 is aligned within the field of view of the guest as the guest moves or looks around the virtual reality retail environment 300. The selected 3D card 330 is anchored to the scaled 3D model 350.

Figure 3P:
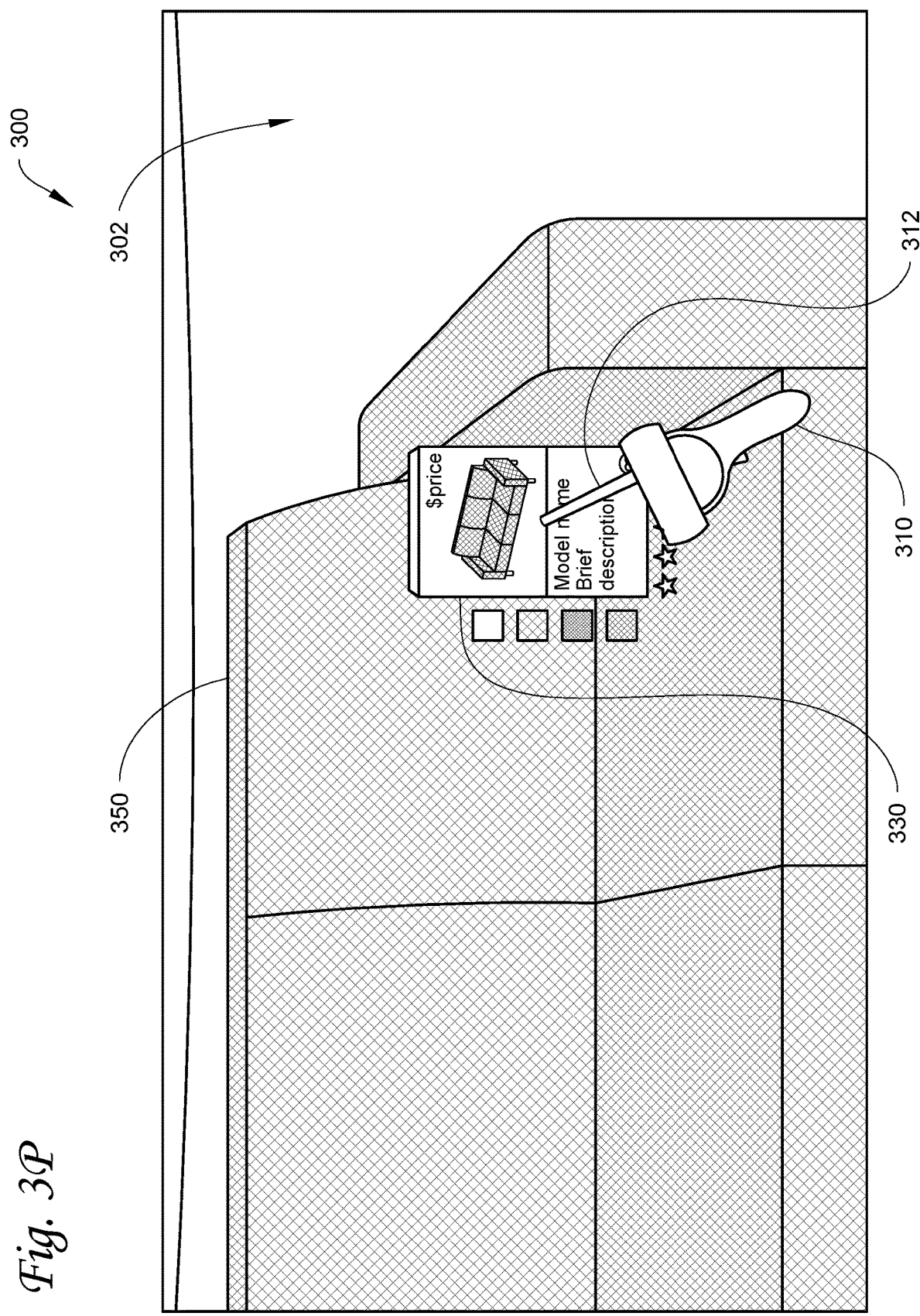
FIG. 3P illustrates another screenshot of a portion of the virtual reality retail environment showing the scaled 3D model and the selected 3D card, according to one embodiment.

In some embodiments, the guest can use the input/output device to un-anchor the selected 3D card from the scaled 3D model and, for example, move the selected 3D card into a different location within the virtual reality retail environment. For example, FIG. 3O shows the guest using the pointer 312 and a command on the input/output device to grab and un-anchor the selected 3D card 330 from the scaled 3D model 350. FIG. 3P illustrates the guest using the pointer 312 and the input/output device to move the selected 3D card 330 onto a portion of the scaled 3D model 350. Accordingly, the guest can manipulate the selected 3D card and the scaled 3D model within the virtual reality retail environment as desired for planning and entertainment purposes. The method 200 then proceeds to 255.

Figure 3Q:
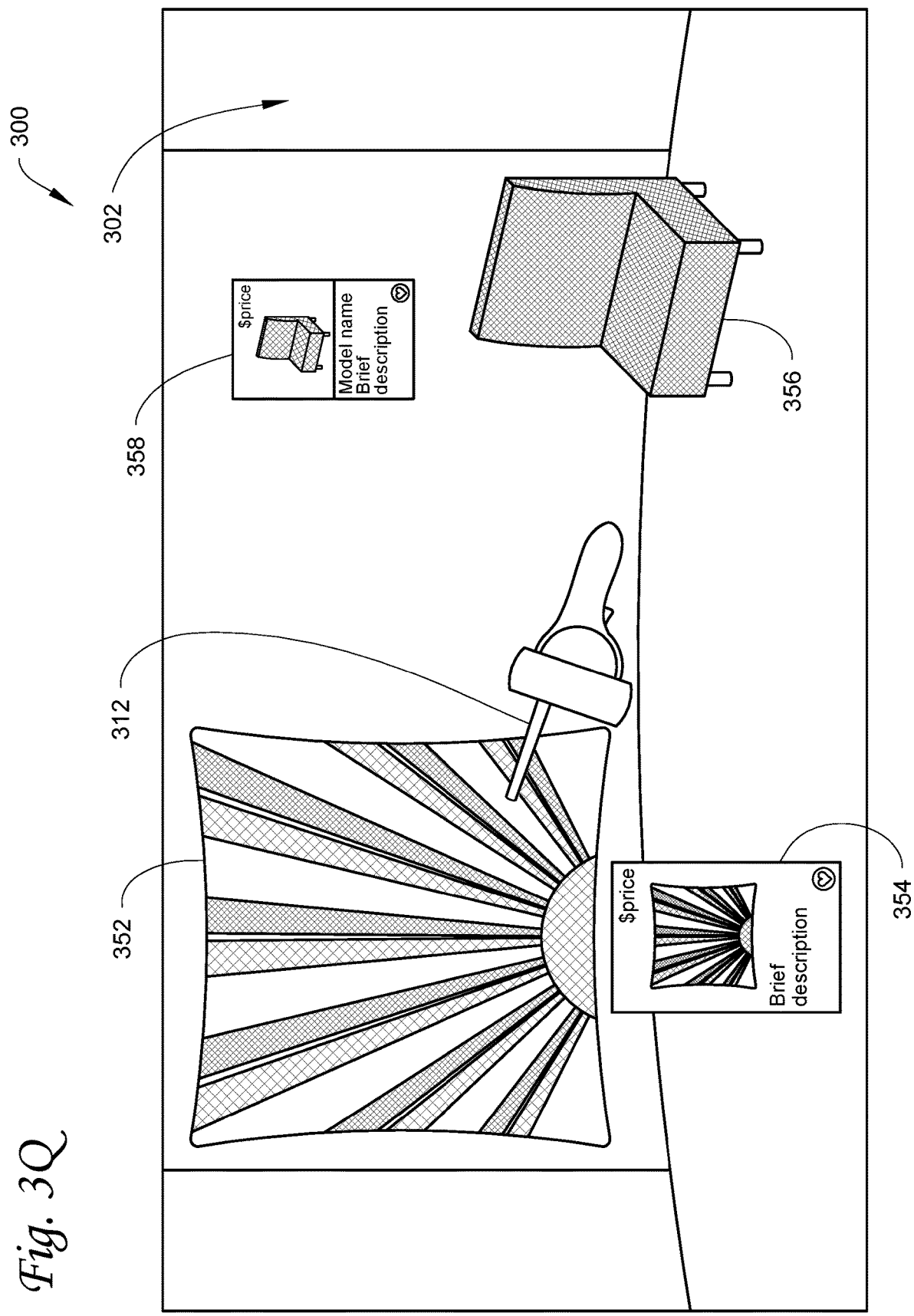
FIG. 3Q illustrates a screenshot of a portion of the virtual reality retail environment showing a second scaled 3D model and a second selected 3D card, according to one embodiment.
Figure 3R:
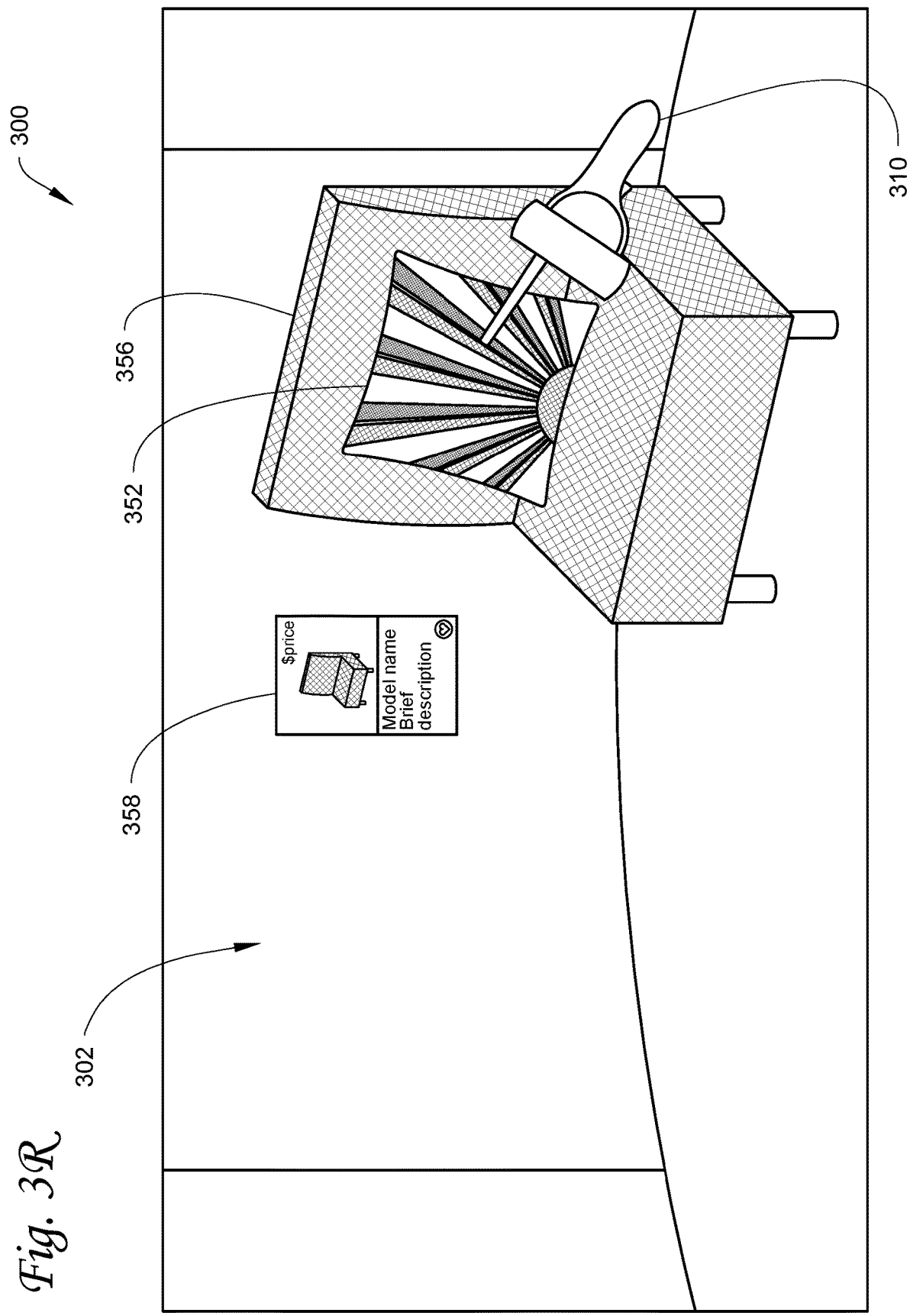
FIG. 3R illustrates a screenshot of a portion of the virtual reality retail environment showing the second scaled 3D model, a third scaled 3D model, and a third selected 3D card, according to one embodiment.
Figure 3S:
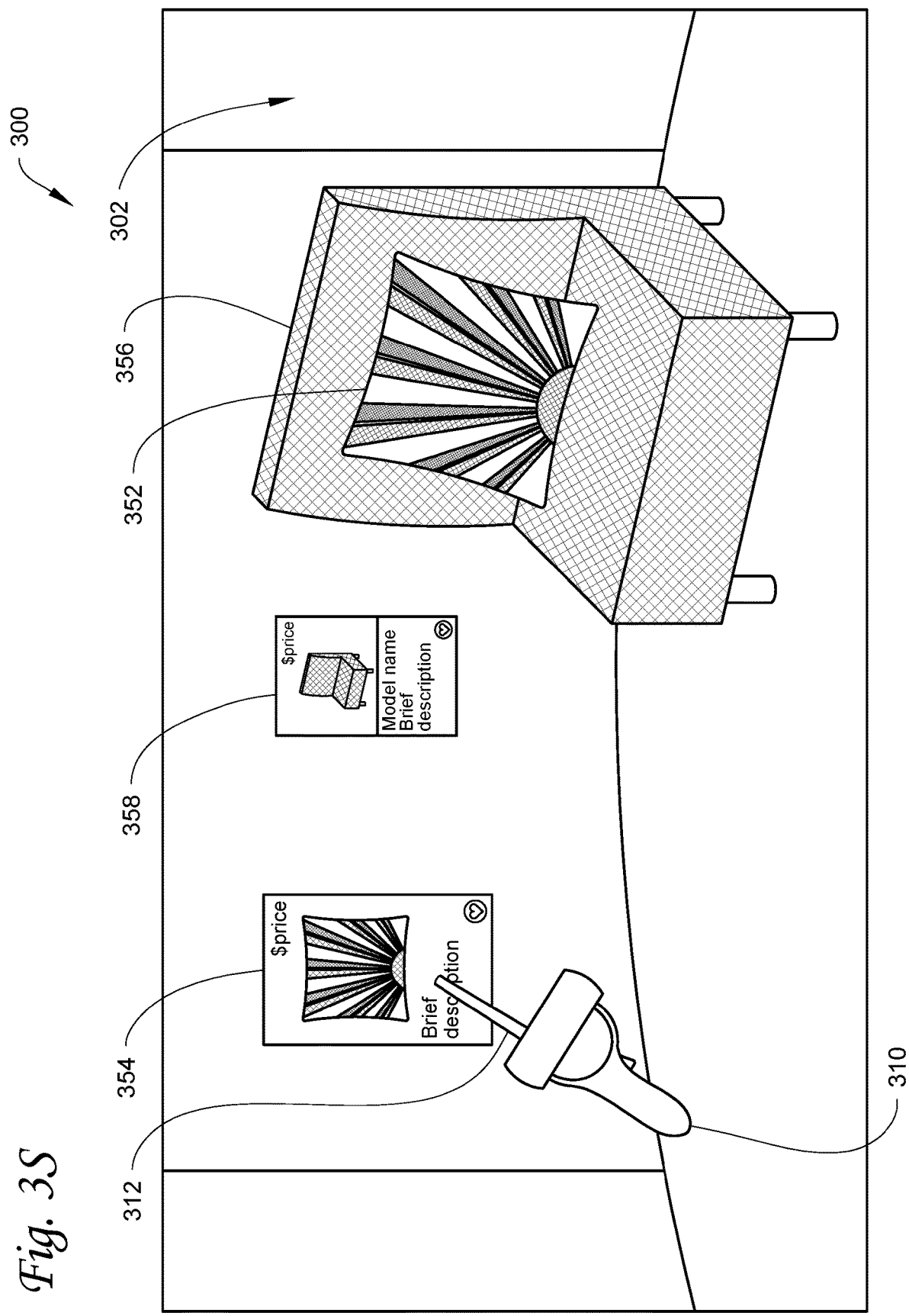

At 255, the virtual reality retail environment receives, via the input/output device, a movement command to move and place the scaled 3D model at a desired location within the virtual reality retail environment. In some embodiments, the guest can use the VR motion controller to move and place the grabbed scaled 3D model at the desired location within the virtual reality retail environment. For example, FIG. 3Q shows the guest using the pointer 312 and a command on the input/output device to grab a second scaled 3D model 352 (in this case a pillow). A second selected 3D card 354 associated with the second selected 3D model 352 is un-anchored to the second selected 3D model 352. At 260, the retailer online service moves the scaled 3D model within the virtual reality retail environment based on the movement command. For example, FIG. 3R illustrates the guest using the pointer 312 and the input/output device to move the second scaled 3D model 352 onto a portion of a third scaled 3D model 356. FIG. 3S illustrates the guest moving the second selected 3D card 354 next to the second scaled 3D model 352. A third selected 3D card 358 associated with the third scaled 3D model 358 is un-anchored and provided adjacent to the third scaled 3D model 358. Accordingly, the guest can manipulate multiple selected 3D cards and multiple scaled 3D models within the virtual reality retail environment as desired for planning and entertainment purposes.

In some embodiments, a 3D card of the card ecosystem guest interface can be a grouping of different products and/or services. In some embodiments, the guest can edit or create new cards for the card ecosystem guest interface. The new cards can include multiple products/services provided by the retailer online service that are grouped together by the guest. The multiple products/services can be two or more of the same product/service provided by the retailer online service and/or two more different products/services provided by the retailer online service. For example, a guest can create a room within the virtual reality retail environment with different products offered by the retailer online service and make a card for that room with information for all of the products in the room. In one embodiment, the guest can use a VR motion controller to capture a screenshot of a room within the virtual reality retail world. The retailer online service can determine the different products/services shown in the screenshot and their relative locations with respect to each other. The retailer online service can also provide the guest an option to create a new 3D card based on the products/services shown in the screenshot. When the guest selects the option to create a new 3D card based on the products/services shown in the screenshot, the retailer online service can generate the new 3D card and display, for example, the screenshot as the picture on the new 3D card. If and when the guest selects the new 3D card, the retailer online service can obtain and loads a miniature 3D model of each of the products/services to be displayed adjacent the selected 3D card within the virtual reality retail environment. Also, the card ecosystem guest interface API can generate a scaled 3D model of each of the products/services associated with the new 3D card within the virtual reality retail environment upon receiving a generate command over the network from the guest. The card ecosystem guest interface API can also load scaled 3D models of each of the products/services in the same layout as provided in the screenshot.

FIG. 4 is a schematic diagram of architecture for a computer device 900, according to an embodiment. The computer device 900 and any of the individual components thereof can be used for any of the operations described in accordance with any of the computer-implemented methods described herein.

The computer device 900 generally includes a processor 910, memory 920, a network input/output (I/O) 925, storage 930, and an interconnect 950. The computer device 900 can optionally include a user I/O 915, according to some embodiments. The computer device 900 can be in communication with one or more additional computer devices 900 through a network 940.

The computer device 900 is generally representative of hardware aspects of a variety of user devices 901 and a server device 935. The illustrated user devices 901 are examples and are not intended to be limiting. Examples of the user devices 901 include, but are not limited to, a desktop computer 902, a cellular/mobile phone 903, a tablet device 904, and a laptop computer 905. It is to be appreciated that the user devices 901 can include other devices such as, but not limited to, a wearable device, a personal digital assistant (PDA), a video game console, a television, or the like. In an embodiment, the user devices 901 can alternatively be referred to as client devices 901. In such an embodiment, the client devices 901 can be in communication with the server device 935 through the network 940. One or more of the client devices 901 can be in communication with another of the client devices 901 through the network 940 in an embodiment.

The processor 910 can retrieve and execute programming instructions stored in the memory 920 and/or the storage 930. The processor 910 can also store and retrieve application data residing in the memory 920. The interconnect 950 is used to transmit programming instructions and/or application data between the processor 910, the user I/O 915, the memory 920, the storage 930, and the network I/O 940. The interconnect 950 can be, for example, one or more busses or the like. The processor 910 can be a single processor, multiple processors, or a single processor having multiple processing cores. In some embodiments, the processor 910 can be a single-threaded processor. In an embodiment, the processor 910 can be a multi-threaded processor.

The user I/O 915 can include a display 916 and/or an input 917, according to an embodiment. It is to be appreciated that the user I/O 915 can be one or more devices connected in communication with the computer device 900 that are physically separate from the computer device 900. For example, the display 916 and input 917 for the desktop computer 902 can be connected in communication but be physically separate from the computer device 900. In some embodiments, the display 916 and input 917 can be physically included with the computer device 900 for the desktop computer 902. In an embodiment, the user I/O 915 can physically be part of the user device 901. For example, the cellular/mobile phone 903, the tablet device 904, and the laptop 905 include the display 916 and input 917 that are part of the computer device 900. The server device 935 generally may not include the user I/O 915. In an embodiment, the server device 935 can be connected to the display 916 and input 917.

The display 916 can include any of a variety of display devices suitable for displaying information to the user. Examples of devices suitable for the display 916 include, but are not limited to, a cathode ray tube (CRT) monitor, a liquid crystal display (LCD) monitor, a light emitting diode (LED) monitor, or the like.

The input 917 can include any of a variety of input devices or input means suitable for receiving an input from the user. Examples of devices suitable for the input 917 include, but are not limited to, a keyboard, a mouse, a trackball, a button, a voice command, a proximity sensor, an ocular sensing device for determining an input based on eye movements (e.g., scrolling based on an eye movement), or the like. It is to be appreciated that combinations of the foregoing inputs 917 can be included for the user devices 901. In some embodiments the input 917 can be integrated with the display 916 such that both input and output are performed by the display 916.

The memory 920 is generally included to be representative of a random access memory such as, but not limited to, Static Random Access Memory (SRAM), Dynamic Random Access Memory (DRAM), or Flash. In some embodiments, the memory 920 can be a volatile memory. In some embodiments, the memory 920 can be a non-volatile memory. In some embodiments, at least a portion of the memory can be virtual memory.

The storage 930 is generally included to be representative of a non-volatile memory such as, but not limited to, a hard disk drive, a solid state device, removable memory cards, optical storage, flash memory devices, network attached storage (NAS), or connections to storage area network (SAN) devices, or other similar devices that may store non-volatile data. In some embodiments, the storage 930 is a computer readable medium. In some embodiments, the storage 930 can include storage that is external to the computer device 900, such as in a cloud.

The network I/O 925 is configured to transmit data via a network 940. The network 940 may alternatively be referred to as the communications network 940. Examples of the network 940 include, but are not limited to, a local area network (LAN), a wide area network (WAN), the Internet, or the like. In some embodiments, the network I/O 925 can transmit data via the network 940 through a wireless connection using Wi-Fi, Bluetooth, or other similar wireless communication protocols. In some embodiments, the computer device 900 can transmit data via the network 940 through a cellular, 3G, 4G, or other wireless protocol. In some embodiments, the network I/O 925 can transmit data via a wire line, an optical fiber cable, or the like. It is to be appreciated that the network I/O 925 can communicate through the network 940 through suitable combinations of the preceding wired and wireless communication methods.

The server device 935 is generally representative of a computer device 900 that can, for example, respond to requests received via the network 940 to provide, for example, data for rendering an online service (e.g., a website, an app, etc.) on the user devices 901. The server 935 can be representative of a data server, an application server, an Internet server, or the like.

Aspects described herein can be embodied as a system, method, or a computer readable medium. In some embodiments, the aspects described can be implemented in hardware, software (including firmware or the like), or combinations thereof. Some aspects can be implemented in a non-transitory, tangible computer readable medium, including computer readable instructions for execution by a processor. Any combination of one or more computer readable medium(s) can be used.

The computer readable medium can include a computer readable signal medium and/or a computer readable storage medium. A computer readable storage medium can include any tangible medium capable of storing a computer program for use by a programmable processor to perform functions described herein by operating on input data and generating an output. A computer program is a set of instructions that can be used, directly or indirectly, in a computer system to perform a certain function or determine a certain result. Examples of computer readable storage media include, but are not limited to, a floppy disk; a hard disk; a random access memory (RAM); a read-only memory (ROM); a semiconductor memory device such as, but not limited to, an erasable programmable read-only memory (EPROM), an electrically erasable programmable read-only memory (EEPROM), Flash memory, or the like; a portable compact disk read-only memory (CD-ROM); an optical storage device; a magnetic storage device; other similar device; or suitable combinations of the foregoing. A computer readable signal medium can include a propagated data signal having computer readable instructions. Examples of propagated signals include, but are not limited to, an optical propagated signal, an electro-magnetic propagated signal, or the like. A computer readable signal medium can include any computer readable medium that is not a computer readable storage medium that can propagate a computer program for use by a programmable processor to perform functions described herein by operating on input data and generating an output.

An embodiment can be provided to an end-user through a cloud-computing infrastructure. Cloud computing generally includes the provision of scalable computing resources as a service over a network (e.g., the Internet or the like).

The terminology used in this specification is intended to describe particular embodiments and is not intended to be limiting. The terms "a," "an," and "the" include the plural forms as well, unless clearly indicated otherwise. The terms "comprises" and/or "comprising," when used in this specification, specify the presence of the stated features, integers, steps, operations, elements, and/or components, but do not preclude the presence or addition of one or more other features, integers, steps, operations, elements, and/or components.

With regard to the preceding description, it is to be understood that changes may be made in detail, especially in matters of the construction materials employed and the shape, size, and arrangement of parts without departing from the scope of the present disclosure. This specification and the embodiments described are exemplary only, with the true scope and spirit of the disclosure being indicated by the claims that follow.

What is claimed is:

1. A computer-implemented method to present graphical user interface in a virtual reality retail environment of a retailer online service, the computer-implemented method comprising:
receiving, via an input device, a command to present a three-dimensional (3D) card ecosystem within the virtual reality retail environment;
causing, via a display device, presentation of the 3D card ecosystem within the virtual reality retail environment, the 3D card ecosystem being aligned within a field of view of a user, and the 3D card ecosystem including a plurality of 3D cards, wherein each of the plurality of 3D cards includes product specific information, the product specific information including: a picture of a product available for purchase from the retailer online service; a product name of the product; a company name of a company associated with the product; and a price of the product;
receiving, via the input device, a selection command to select one of the plurality of 3D cards within the virtual reality retail environment;
causing, via the display device, the selected 3D card to be displayed within the field of view of the user;
causing, via the display device, presentation of additional information on or adjacent the selected 3D card, the additional information including a customer review score of the product associated with the selected 3D card;
causing, via the display device, presentation of a shipping box adjacent the selected 3D card while a miniature 3D model of a product associated with the selected 3D card is loaded in real time within the virtual reality retail environment, the shipping box being anchored to the selected 3D card;
causing, via the display device, replacement of the shipping box with a presentation of the miniature 3D model adjacent the selected 3D card upon the miniature 3D model being loaded in real time within the virtual reality retail environment, the miniature 3D model being anchored to the selected 3D card;
receiving, via the input device, a generation command to generate a scaled 3D model of the product associated with the selected 3D card, wherein the scaled 3D model of the product is scaled to a true size of the product within the virtual reality retail environment;
causing, via the display device, presentation of the scaled 3D model within the field of view of the user; and
receiving, via the input device, a movement command to move and place the scaled 3D model within the virtual reality retail environment.

2. The computer-implemented method of claim 1, further comprising:
a product information application programming interface (API) of the retailer online service requesting, via a network, the product specific information of the product associated with each of the plurality of 3D cards from a database;
the product specific information of the product associated with each of the plurality of 3D cards being sent, via the network, from the database to the product information API; and
the product information API receiving, via the network, the product specific information of the product associated with each of the plurality of 3D cards from the database.

3. The computer-implemented method of claim 1, further comprising a product information API loading the product specific information obtained from a database to the virtual reality retail environment in real time to allow the display device to present the miniature 3D model adjacent the selected 3D card upon receipt of the selection command and to allow the display device to present the scaled 3D model upon receipt of the generation command.

4. The computer-implemented method of claim 1, wherein the product specific information further includes a 3D model package file, the 3D model package file including 3D model data for rendering a plurality of 3D model versions of the product, each of the plurality of 3D model versions having a different level of fidelity, and the plurality of 3D model versions of the product being used to display the miniature 3D model and the scaled 3D model, the scaled 3D model being scaled to a true size of the product/service within the virtual reality retail environment.

5. The computer-implemented method of claim 4, wherein the virtual reality retail environment automatically and continuously selects one of the plurality of 3D model versions to present on the display device as the scaled 3D model based on a distance between a user avatar of the user within the virtual reality retail environment and the scaled 3D model.

6. The computer-implemented method of claim 5, wherein a higher fidelity 3D model version of the plurality of 3D model versions is selected for display on the display device as the scaled 3D model when the user avatar is within a predefined threshold distance from the scaled 3D model and a lower fidelity 3D model version of the plurality of 3D model versions is selected for display on the display device as the scaled 3D model when the user avatar is outside of the predefined threshold distance from the scaled 3D model.

7. The computer-implemented method of claim 4, wherein the virtual reality retail environment automatically selects one of the plurality of 3D model versions to present on the display device as the miniature 3D model, wherein the selected 3D model version is not a highest fidelity level 3D model version of the plurality of 3D model versions.

8. The computer implemented method of claim 1, wherein the selected 3D card is anchored to the scaled 3D model.

9. A system configured to present a graphical user interface in a virtual reality retail environment of a retailer online service, the system comprising:
a retailer online service that is configured to:
receive, via an input device, a command to present a three-dimensional (3D) card ecosystem within the virtual reality retail environment;
cause, via a display device, presentation of the 3D card ecosystem within the virtual reality retail environment, the 3D card ecosystem being aligned within a field of view of a user, and the 3D card ecosystem including a plurality of 3D cards, wherein each of the plurality of 3D cards includes product specific information, the product specific information including: a picture of a product available for purchase from the retailer online service; a product name of the product; a company name of a company associated with the product; and a price of the product;
receive, via the input device, a selection command to select one of the plurality of 3D cards within the virtual reality retail environment;
cause, via the display device, the selected 3D card to be displayed within the field of view of the user;
cause, via the display device, presentation of additional information on or adjacent the selected 3D card, the additional information including a customer review score of the product associated with the selected 3D card;

cause, via the display device, presentation of a shipping box adjacent the selected 3D card while a miniature 3D model of a product associated with the selected 3D card is loaded in real time within the virtual reality retail environment, the shipping box being anchored to the selected 3D card;

cause, via the display device, replacement of the shipping box with a presentation of the miniature 3D model adjacent the selected 3D card upon the miniature 3D model being loaded in real time within the virtual reality retail environment, the miniature 3D model being anchored to the selected 3D card;

receive, via the input device, a generation command to generate a scaled 3D model of the product associated with the selected 3D card, wherein the scaled 3D model of the product is scaled to a true size of the product within the virtual reality retail environment;

cause, via the display device, presentation of the scaled 3D model within the field of view of the user; and receive, via the input device, a movement command to move and place the scaled 3D model within the virtual reality retail environment.

10. The system of claim 9, wherein the retailer online service includes a product information application programming interface (API) that is configured to request, via a network, the product specific information of the product associated with each of the plurality of 3D cards from a database, wherein the product specific information of the product associated with each of the plurality of 3D cards is sent, via the network, from the database to the product information API, and wherein the product information API is configured to receive, via the network, the product specific information of the product associated with each of the plurality of 3D cards from the database.

11. The system of claim 9, wherein a product information API is configured to load the product specific information obtained from a database to the virtual reality retail environment in real time to allow the display device to present the miniature 3D model adjacent the selected 3D card upon receipt of the selection command and to allow the display device to present the scaled 3D model upon receipt of the generation command.

12. The system of claim 9, wherein the product specific information further includes a 3D model package file, the 3D model package file including 3D model data for rendering a plurality of 3D model versions of the product, each of the plurality of 3D model versions having a different level of fidelity, and the plurality of 3D model versions of the product being used to display the miniature 3D model and the scaled 3D model, the scaled 3D model being scaled to a true size of the product/service within the virtual reality retail environment.

13. The system of claim 12, wherein the virtual reality retail environment is configured to automatically and continuously select one of the plurality of 3D model versions to present on the display device as the scaled 3D model based on a distance between a user avatar of the user within the virtual reality retail environment and the scaled 3D model.

14. The system of claim 13, wherein the virtual reality retail environment is configured to select a higher fidelity 3D model version of the plurality of 3D model versions for display on the display device as the scaled 3D model when the user avatar is within a predefined threshold distance from the scaled 3D model and is configured to select a lower fidelity 3D model version of the plurality of 3D model versions is selected for display on the display device as the scaled 3D model when the user avatar is outside of the predefined threshold distance from the scaled 3D model.

15. The system of claim 12, wherein the virtual reality retail environment is configured to automatically select one of the plurality of 3D model versions to present on the display device as the miniature 3D model, wherein the selected 3D model version is not a highest fidelity level 3D model version of the plurality of 3D model versions.

16. The system of claim 9, wherein the selected 3D card is anchored to the scaled 3D model.

* * * * *